United States Patent [19]
Shimoyama et al.

[11] Patent Number: 5,244,469
[45] Date of Patent: Sep. 14, 1993

[54] PROCESS FOR PREPARATION OF BLACK COLORING MATERIALS AND APPLICATION THEREOF: CHITOSAN TREATED WITH BLACK EXTRACT OF LITHOSPERMUM ROOT

[75] Inventors: Susumu Shimoyama, Hasuda; Yasuko Noda, Atugi; Ujo Maeda, Kyoto; Tasuku Shimoyama, Minami-ashigara; Kunio Kataoka, Fuji; Eiichi Eto, Numazu; Mieko Goto, Kanagawa; Yoshio Hara, Isehara; Satoru Shimoyama, Minami-ashigara; Keiko Maeda, Kyoto; Kazumi Konya, Ihara, all of Japan

[73] Assignee: Ihara Chemical Industry Co., Ltd., Tokyo, Japan

[21] Appl. No.: 807,812

[22] Filed: Dec. 13, 1991

Related U.S. Application Data

[63] Continuation of Ser. No. 571,523, Aug. 28, 1990, abandoned.

[30] Foreign Application Priority Data

Dec. 29, 1988 [JP] Japan .................. 63-334712

[51] Int. Cl.5 ............... C09B 61/00; C09B 67/02; D06P 1/34
[52] U.S. Cl. ............................... 8/438; 8/561; 8/623; 8/646; 536/20
[58] Field of Search ............. 8/438, 561, 623, 646

[56] References Cited

U.S. PATENT DOCUMENTS

| 4,603,048 | 7/1986 | Konrad et al. | 424/70 |
| 4,853,429 | 8/1989 | Sannan et al. | 524/29 |
| 4,881,343 | 11/1989 | Sannan et al. | 47/57.6 |

FOREIGN PATENT DOCUMENTS

| 52-094432 | 8/1977 | Japan. |
| 55-102659 | 8/1980 | Japan. |
| 59-010507 | 1/1984 | Japan. |
| 60-126388 | 7/1985 | Japan. |
| 01-234476 | 9/1989 | Japan. |
| 01-294741 | 11/1989 | Japan. |
| 2107340 | 4/1983 | United Kingdom. |

OTHER PUBLICATIONS

WPIL Abstract for Japanese Patent Publication 1294741 Published: Nov. 28, 1989.
Patent Abstracts of Japan for Japanese Patent Publication 1234476 Published: Sep. 19, 1989.
Patent Abstracts of Japan for Japanese Patent Publication 5910507 Published: Jan. 20, 1984.
WPI Abstract for Japanese Patent Publication 52094432 Published: Jan. 31, 1976.
WPIL Abstract for Japanese Patent Publication 1215861 Published: Aug. 29, 1989.

Primary Examiner—A. Lionel Clingman
Attorney, Agent, or Firm—Armstrong & Kubovcik

[57] ABSTRACT

A novel black coloring material is obtained by treating a chitosan with a dyestuff of the lithospermum root. If a water-insoluble chitosan is used as the chitosan, a finely divided black coloring material is obtained, and if a gelatinous chitosan salt is used as the chitosan, a gelatinous black coloring material is obtained. If a water-soluble chitosan, chitosan oligosaccharide or D-glucosamine, or a salt thereof is used as the chitosan, a liquid black coloring material is obtained. If a powdery polymeric substance is treated with such a black coloring material, a polymer-based black coloring material is obtained, and if a fiber is dyed with such a black coloring material, the fiber is dyed to a black color having a low lightness.

19 Claims, 12 Drawing Sheets

PROCESS FOR PREPARATION OF BLACK COLORING MATERIALS AND APPLICATION THEREOF: CHITOSAN TREATED WITH BLACK EXTRACT OF LITHOSPERMUM ROOT

This application is a continuation of application Ser. No. 571,523 filed Aug. 28, 1990 now abandoned.

TECHNICAL FIELD

The present invention relates to a process for the preparation of a black coloring material and an application thereof. More particularly, the present invention relates to a process for preparing a finely divided polymeric black coloring material by using this black coloring material, a process for dyeing a fiber with this black coloring material, and a process for modifying black iron oxide with this black coloring material.

More specifically, the present invention provides a process for the preparation of a finely divided, gelatinous or liquid black coloring material having a black color with a low lightness, i.e., a black color corresponding to a lightness of 1 (N=1) expressed according to the lightness scale of the Munsell Color System in which the difference of the perception of the lightness is divided in a geometric ratio from the complete black in the achromatic state, regarded as being a lightness of 0 (N=0), to the complete white regarded as being a lightness of 10 (N=10), or a color close to this black color.

Furthermore, the present invention provides a process for the preparation of a finely divided black coloring material comprising a natural or synthetic polymer as a base, and a process for dyeing a fiber.

Moreover, the present invention provides a process for modifying black iron oxide (tri-iron tetroxide) which has been used as a black coloring material.

BACKGROUND ART

The dyestuff of the lithospermum root is extracted from a root of lithospermum [botanical name: Lithospermum erythrorhizon Siebold et Zuccarini (Lithospermum officinale linne var. erythrorhizon Maimowicz)-(Borraginacease)], and this dyestuff has been long used from of old as the valuable dye for obtaining a dyeing of a purple color regarded as a "noblest color" in Japan. It is known that this dyestuff is not subject to discoloration and has a good heat resistance, oxidation resistance and light resistance, and that this dyestuff of the lithospermum root has a high safety and is utilized as the coloring material for foods and cosmetics. Practically, at present, this dyestuff is used in the field of cosmetics as a dyestuff applicable to mucosa, i.e., as coloring materials such as lipsticks and eye shadows, but a process for preparing a black coloring material from the dyestuff of the lithospermum root has not been known.

As the conventional black coloring material, there can be mentioned inorganic pigments such as carbon black and black iron oxide, organic pigments such as Aniline Black, tar dyestuffs such as Black dyestuff 401, and various dyes.

These pigments and dyes, however, are not completely satisfactory in safety, allowable application range or lightness (blackness) expected as a black coloring material.

The conventional black-dyeing dyes used for obtaining a finely divided black coloring material from a natural or synthetic polymer as the base or a black fiber have problems in that a heavy metal such as chromium must be used for the dyeing operation and a subsidiary material such as a surface active agent must be used, and some of dyeing methods using these dyes damage the dyed products. In general, an intended black coloring material or black fiber cannot be obtained by a simple dyeing method.

As the carbon black, there can be mentioned furnace black obtained by a continuous incomplete combustion of a natural gas or a petroleum or coal type heavy hydrocarbon oil in a reaction furnace and channel black obtained by burning a natural gas or hydrocarbon gas as a low flame, bringing the low flame into contact with the bottom surface of a channel steel, and collecting carbon formed by a continuous flame decomposition. It is reported that furnace black contains benzpyrene, which is a carcinogenic substance, and in Japan only the use of channel black is allowed in the field of cosmetics, and in the United States, the use of both carbon blacks is inhibited. Accordingly, carbon black cannot be regarded as a safe black coloring material.

Black iron oxide (tri-iron tetroxide, $FeO.Fe_2O_3$) is not a black coloring material showing a black color with a satisfactorily low lightness.

From the viewpoint of safety, the use of organic pigments such as Aniline Black is not allowed for medicines and cosmetics.

Also, tar type dyestuffs involve a risk of toxicity on a human body, and the applicable range is strictly restricted. For example, Black dyestuff 401 formed by subjecting Naphthol Blue Black, which is a tar type dyestuff, to a lake-forming reaction with aluminum sulfate cannot be used for a product to be applied onto a mucous membrane portion, and use of this dyestuff is greatly restricted. Moreover, in general, tar type dyestuffs have inferior fastness characteristics to inorganic black coloring materials such as black iron oxide, and tar type dyestuffs have problems in that they are slightly eluted into water even under neutral conditions.

As the black-dyeing dye conventionally used for obtaining a finely divided black coloring material from a natural or synthetic polymer as the base or a black fiber, there can be mentioned Acid Fast Black VLG (color index and number: C.I. Acid Black 25; dyes and pigments will be indicated in the same manner hereinafter), Acid Black WA (C.I. Acid Black 52), Chrome Black P2B (C.I. Mordant Black 7) and Chrome Black T (C.I. Mordant Black 11), which have been used for dyeing such substrates as wool, silk and nylon to a black color, and Reactive Black B (C.I. Reactive Black 5) which has been used for dyeing such substrates as cotton and rayon to a black color. Acid Fast Black VLG is a milling type acid dye, for which an addition of a nonionic or amphoteric surface active agent as a subsidiary agent is necessary, and since this dye has a relatively high molecular weight, the dye is suitable for dyeing a coarse fiber but has a poor compatibility with a finely divided substrate. Acid Black WA is a 1:1 type chromium complex salt dye and when this dye is used, single-bath dyeing is possible. Nevertheless, since the dyeing operation is carried out at a pH value of about 2, wool or the like is easily damaged, and therefore, this dye is now used only for a limited number of specific articles. Each of Chrome Black P2B and Chrome Black T is a chromium dye, and when these dyes are used, a dyeing process is adopted in which a chromium complex is formed on a fiber or other substrate to be dyed by using a dichromate. These chromium dyes are disadvantageous in that the use of chromium, a heavy metal, cannot be avoided.

Reactive Black B is a reactive dyestuff, and this dye has a problem in that, as in the case of other reactive dyestuffs, a long time and a large amount of energy are necessary for the washing operation conducted after the dyeing.

DISCLOSURE OF THE INVENTION

An object of the present invention is to overcome the above-mentioned defects of the conventional black coloring materials and the conventional processes for the preparation of black coloring materials and provide processes for the preparation of black coloring materials and black fibers having a good fastness and a very low lightness, and a process for modifying black iron oxide.

In accordance with one aspect of the present invention, there is provided a process for the preparation of a black coloring material, which comprises treating a chitosan with a dyestuff of the lithospermum root. This coloring material is in the finely divided, gelatinous or liquid form.

In accordance with another aspect of the present invention, there is provided a process for the preparation of a finely divided black coloring material, which comprises placing the above-mentioned gelatinous black coloring material in contact with an aqueous solution of an alkali.

In accordance with still another aspect of the present invention, there is provided a process for the preparation of a finely divided black coloring material, which comprises forming a black film of the above-mentioned black coloring material and then pulverizing this black film.

In accordance with still another aspect of the present invention, there is provided a process for the preparation of a finely divided black coloring material, which comprises dyeing a finely divided natural or synthetic polymeric substance with the above-mentioned gelatinous or liquid black coloring material.

In accordance with still another aspect of the present invention, there is provided a process for dyeing a fiber, which comprises dyeing a natural or artificial fiber with the above-mentioned gelatinous or liquid black coloring material.

In accordance with a further aspect of the present invention, there is provided a process for the modification of black iron oxide, which comprises sticking the above-mentioned gelatinous or liquid black coloring material to the surface of black iron oxide.

Figure 1:
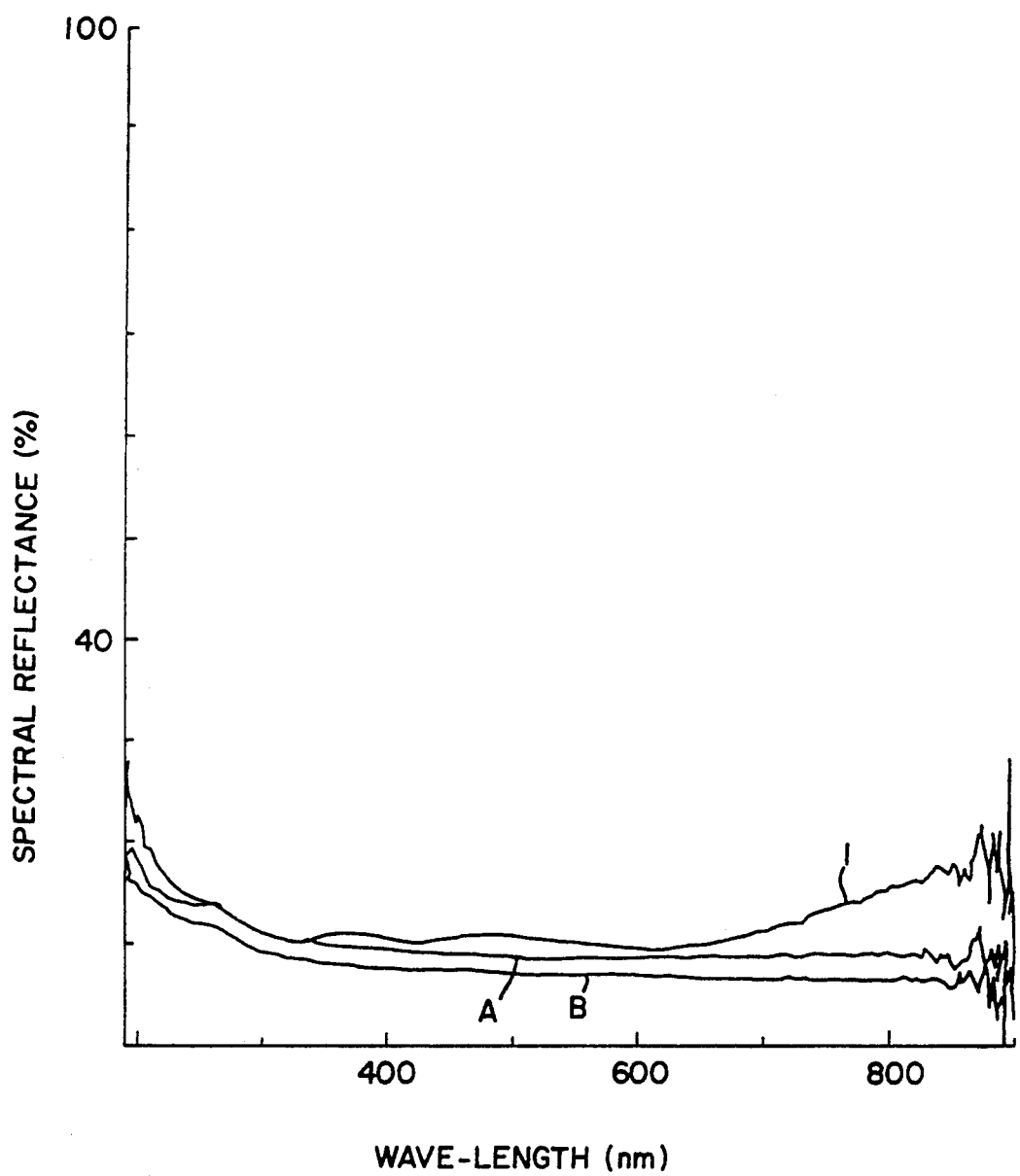
FIGS. 1 through 12 are spectral reflectance spectra in the region of 190 nm to 900 nm, as determined by a spectrophotometer using an integrating sphere (Model Ubest-50 supplied by Nippon Bunko Kogyo).

In each of these Figs., A shows the reflectance spectrum of black iron oxide (Mapico Black BL-100 supplied by Titanium Kogyo) as the conventional black coloring material and B shows the reflectance spectrum of carbon black (Carbon Black Special 6 supplied by Degussa), and other numbered reflectance spectra are reflectance spectra of black coloring materials, black fibers and modified black iron oxide obtained in the respective examples; the respective spectrum numbers corresponding to the example numbers.

BEST MODE FOR CARRYING OUT THE INVENTION

If chitosan having a chemical structure comprising $\beta$-(1,4)-bonded D-glucosamine units is treated with the dyestuff of the lithospermum root, surprisingly, chitosan is dyed a black color even though the dyestuff of the lithospermum root, which is considered to show a purple color, is used.

As the dyestuff of the lithospermum root, used in the present invention, there can be used any of a dyestuff extract obtained by extraction of a root of the gromwell (the lithospermum root), shikonin obtained by the cell culture of the gromwell and synthetic shikonin.

A shikonin compound represented by the following general formula (1):

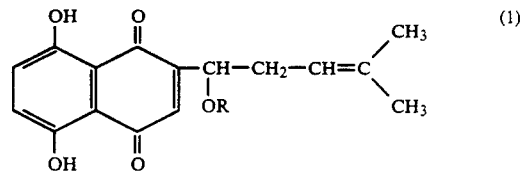

wherein R represents a hydrogen atom or an organic group, is contained in the natural lithospermum root. The compound of general formula (1) in which R is a hydrogen atom is shikonin, and in other shikonin compounds of formula (1), —OR forms an ester.

The dyestuff extract of the lithospermum root used in the present invention is a concentrate obtained, usually by finely crushing a dry root of the gromwell, charging the crushed root in a cylindrical vessel, adding an extraction solvent thereto in an amount such that the crushed root is completely immersed in the extraction solvent, allowing the immersed crushed root to stand for 2 to 5 days, filtering the extraction solution to remove the gromwell root, and concentrating the filtrate to remove the solvent used for the extraction of the dyestuff by evaporation.

As the extraction solvent used for the extraction of the dyestuff of the lithospermum root, there can be mentioned ordinary organic solvents such as methyl alcohol, ethyl alcohol, propyl alcohol, isopropyl alcohol, butyl alcohol, ethylene glycol, propylene glycol, dimethyl ether, diethyl ether, isopropyl ether, dioxane, acetone, methyl isobutyl ketone, methyl ethyl ketone, ethyl acetate, dichloromethane, chloroform, carbon tetrachloride, trichloroethylene, perchloroethylene, benzene, and toluene.

By this method, a dyestuff extract of the lithospermum root is obtained from a dry root of the gromwell in an amount of about 4 to about 5% (W/W %). This dyestuff extract of the lithospermum root contains a dyestuff comprising shikonin and shikonin compounds such as isobutylshikonin, $\beta,\beta$-dimethylacrylshikonin, acetylshikonin, teracrylshikonin and $\beta$-hydroxyisovalelylshikonin. Furthermore, the dyestuff extract includes impurities such as water-soluble fatty acids and valeric acid, and these impurities emit a smell characteristic of the lithospermum root.

If the extraction temperature is elevated and the extraction time is prolonged, the amount of the impurities is increased. Accordingly, the extraction temperature and extraction time are preferably adjusted to room temperature and about 2 to about 3 days, respectively. When the characteristic smell of the lithospermum root is especially repugnant, a dyestuff of the lithospermum root obtained by further purifying the obtained dyestuff extract of the lithospermum root is preferably used.

As the purification process for removing water-soluble impurities from the dyestuff extract of the lithospermum and recovering only the dyestuff components such as shikonin in the fractionated state, there can be adopted a process in which the extract is subjected to the silica gel column chromatography or treated with FLORISIL (activated magnesium silicate supplied by Florisil Co.).

An organic solvent having a relatively low polarity and a boiling point not higher than 50° C./10 to 30 mmHg under a reduced pressure at the time of the concentration is preferably used as the elutant for the purification by the silica gel chromatography, because some shikonin compounds are not stable against heat. For example, chlorinated hydrocarbons such as dichloromethane, chloroform, carbon tetrachloride, trichloroethylene and perchloroethylene, and aromatic hydrocarbons such as toluene and benzene, are preferably used.

When the dyestuff extract of the lithospermum root purified in the above-mentioned manner is used, the intended blackening of chitosans can be accomplished even if the degree of deacetylation is relatively low, and if a chitosan having a high degree of deacetylation and this purified pigment are used, an intended product having a low lightness and a high blackness can be obtained.

Shikonin obtained by the cell culture of the gromwell is manufactured by selecting a strain having a high shikonin productivity from a protoplast obtained by an enzyme treatment of a callus (indeterminate cell aggregate) formed from a cut end of the gromwell and subjecting the strain to a two-stage culturing using a cell-propagating culture medium of the first stage and a shikonin-producing culture medium of the second stage. Shikonin produced by this cell culture has already been commercially manufactured.

Synthetic shikonin is synthesized by using dihydronaphthalene or 2-formyl-1,4,5,8-tetramethoxynaphthalene as the starting material.

The chitosan comprising β-(1,4)-bonded D-glucosamine units, which is used in the present invention, is formed by deacetylating chitin, which is obtained by removing mineral components such as calcium carbonate and proteins from a shell cuticle of a crustacean present widely available in nature, such as a crab or a lobster, with an alkali such as sodium hydroxide.

The chitin obtained by removing mineral components and proteins from a shell cuticle of a crustacean is a polysaccharide having a long linear structure comprising many β-(1,4)-bonded N-acetyl-D-glucosamine residues represented by the following general formula (2):

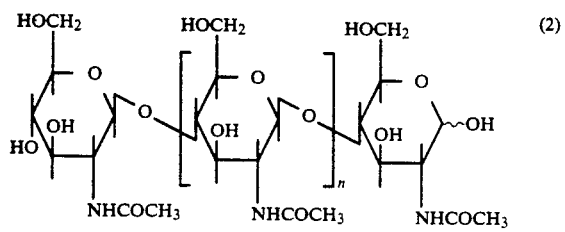

The chitosan, used in the present invention, is a water-insoluble polymer (polysaccharide) having a long linear structure, resembling that of cellulose, which comprises many β-(1,4)-bonded D-glucosamine units as represented by the following general formula (3), where the acetamide group portion bonded at the 2-position of the chitin represented by the above general formula (2) is converted to an amino group by the deacetylation:

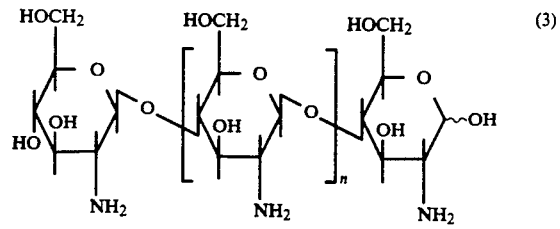

The molecular weight of the chitosan depends on the treatment conditions for separating chitin by removing mineral components and proteins from a shell cuticle of a crustacean and the degree of the cleavage of glycoside bonds among the molecules by the alkali deacetylation, but in general, the chitosan has a molecular weight of 100,000 to 350,000.

The usual chitosan is not a completely deacetylated product but contains a certain degree of acetyl groups. The chitosan used in the present invention may be either a chitosan in which the acetamide group portion bonded to the 2-position of chitin is deacetylated as represented by general formula (3), or a partially deacetylated chitosan in which an N-acetyl-D-glucosamine residue, as represented by general formula (2), is partially and randomly left in the molecule according to the degree of deacetylation of chitin. In the chitosan used in the present invention, however, a high degree of deacetylation is preferable, and a chitosan deacetylated to a degree of almost 90% is especially preferably used. If the present invention is carried out by using a chitosan having a high degree of deacetylation, a low-lightness black coloring material or black fiber and modified black iron oxide, which can absorb rays of the entire visible region (380 to 780 nm), can be obtained.

When a chitosan having a low degree of acetylation is used, reflectance spectra are left in the long-wavelength regions of 310 to 400 nm (purple), 430 to 600 nm) (green) and more than 600 nm (red). To obtain a black color absorbing rays of the entire visible region (380 to 780 nm) while cancelling these reflectance spectra, it is necessary to repeat the dyeing with the dyestuff of the lithospermum root several times. Accordingly, the dyeing with the chitosan must be carried out in the presence of a water-soluble metal salt, as described hereinafter.

When a black coloring material is prepared by treating a chitosan with the dyestuff of the lithospermum root according to the present invention, if a water-insoluble chitosan is used as the chitosan, a finely divided black coloring material can be obtained, and if a gelatinous chitosan salt is used as the chitosan, a gelatinous black coloring material can be prepared. If a water-soluble chitosan, a chitosan oligosaccharide, or D-glucosamine or an inorganic acid or organic acid salt thereof is used a liquid black coloring material is obtained.

A polymeric water-insoluble chitosan having a molecular weight of about 100,000 to about 350,000 or a product having a reduced molecular weight of about 20,000 to about 30,000, which is obtained by partially hydrolyzing this polymeric chitosan with an acid such as hydrochloric acid or by enzymatically decomposing this polymeric chitosan with a chitosanase produced from Streptomyces sp. No. 6 or a *Penicillium islandicum* QN 75751, can be used as the water-insoluble chitosan.

The gelatinous chitosan salt is prepared by dissolving the above-mentioned water-insoluble chitosan in a dilute aqueous solution of an inorganic acid or organic acid. As the acid for dissolving the water-insoluble chitosan, there can be used inorganic acids such as hydrochloric acid, nitric acid and phosphoric acid, and organic acids such as formic acid, oxalic acid, acetic acid, propionic acid, lactic acid, malic acid, succinic acid and adipic acid. The concentration of the acid is preferably 0.5 to 5% (W/V %). As the water-insoluble chitosan is dissolved in the dilute aqueous solution of the acid, the viscosity of the solution increases and the solution becomes gelatinous. The concentration of the water-insoluble chitosan in the dilute aqueous solution of the acid is not critical, as long as the obtained gel has a degree of flowability, but in general, the concentration of the water-insoluble chitosan in the dilute aqueous solution of the acid is preferably 0.5 to 3% (W/V %).

The water-soluble chitosan can be obtained by reducing the molecular weight of the water-insoluble chitosan by the hydrolysis or enzyme decomposition, and a water-soluble chitosan having a molecular weight of 200 to 10,000 is generally used. As the chitosan oligosaccharide, there can be mentioned those having a chitosan polymerization degree of 2 to 8 [n in the above-mentioned general formula (3) is from 0 to 6], such as chitobiose, chitotriose, chitotetraose, chitopentaose, chitohexaose, chitoheptaose and chitooctaose. D-Glucosamine can be obtained by completely hydrolyzing a chitin with concentrated hydrochloric acid or the like. These water-soluble chitosan, chitosan oligosaccharide and D-glucosamine can be in the form of inorganic acid or organic acid salts.

The same inorganic and organic acids as described above with respect to the formation of the gelatinous chitosan salt can be used as the acid for the formation of such salts.

The preparation of a finely divided black coloring material by the treatment of the water-insoluble chitosan with the dyestuff of the lithospermum root is generally accomplished by dispersing a powdery water-insoluble chitosan with stirring in a dyeing bath prepared by adding a solution of the dyestuff of the lithospermum root in an organic solvent to a water bath and heating the mixture.

The dyeing bath is preferably alkaline, and if the dyeing bath is acidic, the water-insoluble chitosan is dissolved. When the solution of the lithospermum root in the organic solvent is added to the water bath, the dyeing bath is weakly acidic and has a pH value of about 4 to about 5, but since the chitosan has a buffering action based on the free amino group, when the water-insoluble chitosan is incorporated into the dyeing bath, the pH value is conveniently shifted to the alkaline side, i.e., to a level of 6 to 8. Accordingly, the chitosan can be dyed in the water-insoluble state even without adjusting the pH value by adding an alkaline aqueous solution.

When the dyeing is carried out at a predetermined temperature for a predetermined time, the water-insoluble chitosan is blackened. An intended finely divided black coloring material can be obtained by recovering the blackened chitosan by filtration, drying the recovered chitosan, and pulverizing the dried chitosan by a wet pulverizer or the like, and even if the obtained black coloring material is finely pulverized, a whitening or increase of the lightness does not occur, and an excellent fastness is manifested.

The formation of a gelatinous black coloring material by the treatment of a chitosan salt with the dyestuff of the lithospermum root is generally accomplished by adding a solution of the dyestuff of the lithospermum root in an organic solvent to a water bath, adding a gelatinous chitosan salt in the thus-formed dyeing bath under heating and stirring the dyeing bath containing the gelatinous chitosan salt dissolved therein. Alternatively, a process can be adopted in which an inorganic acid or organic acid is diluted with water, a predetermined amount of the water-insoluble chitosan is dissolved in this dilution to form a gelatinous chitosan salt, a solution of the dyestuff of the lithospermum root in an organic solvent is added to the above solution, and the formed dyeing bath is heated with stirring.

Since the pH value of the dyeing bath formed by adding the solution of the dyestuff of the lithospermum root in the organic solvent to the water bath is 4 to 5, and the pH value of the gelatinous chitosan salt to be added to this dyeing bath is 4 to 5, the dyeing is carried out at a dyeing bath pH value of 4 to 5.

When the dyeing is carried out at a predetermined temperature for a predetermined time, the solution of the gelatinous chitosan salt in the dyeing bath is blackened, and the obtained blackened solution is concentrated by removing the solvent under a reduced pressure until a desired viscosity is attained, whereby an intended gelatinous black coloring material can be obtained.

The thus-obtained gelatinous black coloring material can be used for (a) preparing a black coloring material by placing the obtained gelatinous black coloring material in contact with an aqueous solution of an alkali, (b) preparing a polymer-based black coloring material by treating a finely divided polymeric substance with the obtained gelatinous black coloring material, (c) dyeing a fiber, and (d) modifying black iron oxide.

The preparation of a liquid black coloring material by the treatment of the water-soluble chitosan, chitosan oligosaccharide, D-glucosamine or an inorganic or organic acid salt thereof with the dyestuff of the lithospermum root is generally accomplished by incorporating and dissolving the water-soluble chitosan, chitosan oligosaccharide, D-glucosamine or an inorganic or organic acid salt thereof in a dyeing bath formed by adding a solution of the dyestuff of the lithospermum root in an organic solvent to a water bath, heating the mixture, and stirring the dyeing bath. Alternatively, a process can be adopted in which the water-soluble chitosan, chitosan oligosaccharide, D-glucosamine or an inorganic or organic acid salt thereof is dissolved in water, a solution of the dyestuff of the lithospermum root in an organic solvent is added to the thus-prepared aqueous solution, and the mixture is heated and stirred.

When the water-soluble chitosan, chitosan oligosaccharide or D-glucosamine is used, the dyeing bath has a pH value of about 7 and is neutral, and when an inorganic acid or organic acid salt thereof is used, the pH value of the dyeing bath is 4 to 5 and the dyeing is carried out in a weakly acidic condition.

When the dyeing is carried out at a predetermined temperature for a predetermined time, the solution in the dyeing bath is blackened. The obtained black solution is directly used as the intended liquid black coloring material, or the obtained black solution is concentrated to a desired concentration by removing the solvent under a reduced pressure, whereby an intended liquid black coloring material is prepared.

The obtained liquid black coloring material can be directly used for (a) preparing a polymer-based black coloring material by treating a finely divided polymeric substance with the liquid black coloring material, (b) dyeing a fiber, and (c) modifying black iron oxide.

Common matters in the treatment of water-insoluble chitosan, gelatinous chitosan salts, water-soluble chitosan, chitosan oligosaccharides, D-glucosamine, and inorganic acid and organic acid salts thereof will now described in detail.

In each case, when the dyestuff extract obtained by the extraction of the lithospermum root is used, the obtained extract solution can be directly used without concentrating the extract solution.

As the organic solvent for dissolving the dyestuff extract (concentrate) of the lithospermum root or the shikonin obtained by the cell culture of the lithospermum root, there can be preferably used the same organic solvents as mentioned above with respect to the extraction of the lithospermum root dyestuff from the root of the gromwell. When an organic solvent immiscible with water is used, a heterogeneous solvent system comprising a layer of the used organic solvent and a layer of water is formed, but no problem arises due to the formation of such a heterogeneous solvent system.

The prepared dyeing bath is a mixed solvent comprising water and the organic solvent used for dissolving the dyestuff of the lithospermum root, and the mixing ratio between water and the organic solvent can be freely selected. The amount of the solvent in the dyeing bath comprising the mixture of water and the organic solvent is preferably such that the ratio of the volume of the solvent to the weight of the chitosan is 5 to 30.

The amount of the lithospermum root dyestuff depends on the deacetylation degree of the chitosan and the kind of the lithospermum root dyestuff. When the lithospermum root extract (concentrate) is used as the lithospermum root dyestuff, the extract is used in an amount of at least 10% (W/W %), preferably at least 20% (W/W %), based on the weight of the chitosan to be dyed. When the lithospermum root dyestuff obtained by purifying the lithospermum root dyestuff extract by the silica gel column chromatography or the treatment with FLORISIL or the shikonin obtained by the cell culture is used, the purified dyestuff or shikonin is used in an amount of at least 3% (W/W %), preferably at least 10% (W/W %), based on the weight of the chitosan. Nevertheless, even if the amount of the lithospermum root dyestuff used is small and below the above-mentioned range, by repeating the dyeing operation, a black coloring material having a low lightness can be obtained.

The dyeing can be carried out at room temperature, but in this case, a along time is required for blackening the chitosan. Accordingly, the dyeing is accomplished by maintaining the dyeing bath at a temperature of 60° to 90° C. for 30 minutes to 2 hours. The dyeing also can be accomplished by using a dyeing apparatus equipped with a cooling tube or the like while refluxing the solvent, or by using an open system dyeing bath while diffusing the solvent to the outside.

What is important is that black coloring materials different in form, such as finely divided, gelatinous and liquid coloring materials, can be obtained from chitosans differing in molecular weight or salts thereof and lithospermum root dyestuff, and black coloring materials having a very low lightness are obtained by using a chitosan having a high degree of deacetylation, preferably a degree of deacetylation of at least 90%, and a purified lithospermum root dyestuff.

Another finely divided black coloring material can be prepared by bringing the thus-obtained gelatinous black coloring material in contact with an aqueous solution of an alkali. More specifically, the thus obtained gelatinous black coloring material is added dropwise in an aqueous alkali solution with strong stirring, whereby a powdery black solid is precipitated. The precipitated black solid can be easily recovered by filtration, and an intended black coloring material can be obtained by drying and pulverizing the recovered black solid.

An aqueous solution of sodium hydroxide, potassium hydroxide or sodium carbonate having a concentration of 5 to 20% is used as the aqueous alkali solution. The temperature at which the gelatinous black coloring material is brought into contact with the aqueous alkali solution is not particularly critical, but a temperature of 30° to 50° C. is preferably adopted. To impart a fine particle size to the black coloring material precipitated and formed by the contact with the aqueous alkali solution, preferably the gelatinous black coloring material is added dropwise with a mechanical strong stirring.

Furthermore, still another finely divided black coloring material can be prepared by forming a black film from the gelatinous black coloring material obtained in the above-mentioned manner and pulverizing this film.

More specifically, the finely divided black coloring material can be obtained by dyeing a gelatinous chitosan salt with shikonin at a predetermined temperature for a predetermined time, and the gelatinous chitosan salt in the blackened dyeing bath is coated on a smooth flat surface, for example, a glass surface, either directly or after concentration and subsequent dilution with an organic acid, drying the coated, surface, and pulverizing the formed film. The gelatinous chitosan salt used is preferably a salt of an organic acid. An optimum salt is an acetate.

What should be noted is that, even if the gelatinous black coloring material obtained by using the lithospermum root dyestuff extract as the lithospermum root dyestuff is placed in contact with an aqueous alkali solution, the obtained powdery black coloring material has substantially no smell and the peculiar smell characteristic of the lithospermum root extract is not encountered at all. Accordingly, the obtained powdery black coloring material is especially preferably used when the smell characteristic of the lithospermum root is repugnant.

Moreover, a powdery polymer-based black coloring material can be obtained by dyeing a powdery natural or synthetic polymer with the gelatinous or liquid black coloring material prepared in the above-mentioned manner. Similarly, a black fiber can be obtained by dyeing a natural or artificial fiber with the gelatinous or liquid black coloring material.

More specifically, a polymer-based black coloring material or black fiber can be obtained by immersing a finely divided polymer or fiber in a water bath comprising a gelatinous chitosan salt, water-soluble chitosan, chitosan oligosaccharide or D-glucosamine or an inorganic acid or organic acid salt thereof dissolved therein, adding a solution of the lithospermum root dyestuff in an organic solvent into the water bath, and maintaining the dyeing bath at a temperature of 60° to 90° C. for 30 minutes to 1 hour.

Alternatively, a process can be adopted in which, at the first step, a powdery polymer or fiber to be dyed is immersed in a water bath comprising, dissolved therein, a gelatinous chitosan salt, water-soluble chitosan, chitosan oligosaccharide or D-glucosamine or an inorganic acid or organic acid salt thereof, the water bath is boiled for 10 to 30 minutes and the material to be dyed is taken out, naturally cooled and dried, and at the second step, a solution of the lithospermum root dyestuff in an organic solvent is added to the water bath, the formed dyeing bath is heated, the material treated at the first step is immersed in the dyeing bath, and the dyeing bath is maintained at a temperature of 60° to 90° C. for 30 minutes to 1 hour.

The dyeing of the powdery polymeric substance is accomplished by stirring the dyeing bath so that the powder is dispersed in the dyeing bath, and the dyeing of the fiber is accomplished by gently stirring the dyeing bath. If the dyeing is carried out at a predetermined temperature for a predetermined time, the powder or fiber in the dyeing bath is colored black, and an intended finely divided black coloring material or black fiber is obtained by taking out the dyed material, washing it with warm water, and drying it with air.

As the finely divided natural or synthetic substance, there can be mentioned powders having a size of several microns to scores of microns, for example, powders of natural polymers such as cellulose powder and silk powder (silk protein or fibroin) and powders of synthetic polymers such as nylon 6 powder, nylon 12 powder, finely divided polyethylene, finely divided crosslinked polyester, finely divided polypropylene and finely divided crosslinked polystyrene. As the natural or artificial fiber, there can be mentioned, for example, natural fibers such as fibers of cellulose, silk and wool, and artificial fibers of nylon 6, nylon 66, nylon 610, polyester, acrylic polymer, Vinylon, polyethylene, polypropylene, vinylidene polymer, polyurethane, polykural, rayon, polynodik, cupra, acetate, and triacetate. The shape of the fiber can be any of a staple, yarn, filament, woven fabric, knitted fabric, and nonwoven fabric.

The amount of the gelatinous chitosan salt, water-soluble chitosan, chitosan oligosaccharide or D-glucosamine or the inorganic acid or organic acid salt thereof is at least 10% (W/W %), preferably at least 20% (W/W %), based on the powdery polymeric substance or fiber. In this case, the amount of the gelatinous chitosan salt is calculated from the water-soluble chitosan dissolved in the dilute aqueous solution of the acid for the formation of the gelatinous chitosan salt. The amount of the lithospermum root dyestuff is the same as the amount of the lithospermum root dyestuff used for the chitosan for obtaining the above-mentioned gelatinous or liquid black coloring material.

The pH value of the dyeing bath is neutral value of about 7 when the water-soluble chitosan, chitosan oligosaccharide or D-glucosamine is used, and the dyeing is carried out at a weakly acidic pH value of 4 to 5 when the inorganic acid or organic acid salt of the water-soluble chitosan, chitosan oligosaccharide or D-glucosamine is used.

What is important is that various powdery polymers and fibers can be dyed black by the simple dip dyeing process. Especially, the present invention is suitable for black-dyeing wool, silk and nylon having amino groups ($-NH_2$) and carboxyl groups ($-COOH$) at the ends of the molecule structure and acid amid bonds ($-CONH-$) in the molecule structure, and a finely divided black coloring material or black fiber having an excellent washing fastness and light fastness can be obtained.

Black iron oxide can be modified by sticking the gelatinous or liquid black coloring material prepared in the above-mentioned manner to the surface of black iron oxide. More specifically, finely divided black iron oxide is immersed in a water bath formed by dissolving and dispersing a gelatinous chitosan salt, water-soluble chitosan, chitosan oligosaccharide or D-glucosamine or an inorganic acid or organic acid salt thereof in water and a solution of the lithospermum root dyestuff in an organic solvent is added to the water bath, whereby black iron oxide is modified. This modification can be carried out in the same manner as described above except that black iron oxide is used instead of the powdery polymer or fiber.

What is important is that the blackness of black iron oxide, in which a satisfactory lightness (blackness) cannot be obtained according to the conventional technique, can be increased and the black iron oxide can be modified to a black coloring material having a required black color. Furthermore, it is expected that new functions will be attained by the modification of black iron oxide, which is a magnetic material, with a chitosan having an affinity with a living body.

Each of the foregoing treatments summarized below can be carried out in the presence of a water-soluble salt.

(1) A black coloring material is prepared by dyeing a water-insoluble chitosan with the lithospermum root dyestuff.

(2) A gelatinous black coloring material is prepared by dyeing a gelatinous chitosan salt with the lithospermum root dyestuff.

(3) A liquid black coloring material is prepared by dyeing a water-soluble chitosan, chitosan oligosaccharide or D-glucosamine or an inorganic acid or organic acid salt thereof with the lithospermum root dyestuff.

(4) A finely divided black coloring material or black fiber is prepared by treating a finely divided polymeric substance or fiber with a gelatinous chitosan salt, water-soluble chitosan, chitosan oligosaccharide or D-glucosamine or an inorganic acid or organic acid salt and the lithospermum root dyestuff.

(5) Black iron oxide is modified with a gelatinous chitosan salt, water-soluble chitosan, chitosan oligosaccharide or D-glucosamine or an inorganic acid or organic acid salt thereof and the lithospermum root dyestuff.

At least one water-soluble salt selected from sodium salts, potassium salts, magnesium salts, calcium salts, barium salts, zirconium salts, iron salts, nickel salts, aluminum salts and silicates is used as the water-soluble metal salt. As specific examples of the water-soluble metal salt, there can be mentioned sodium chloride, sodium carbonate, sodium hydroxide, sodium laurate, sodium citrate, sodium metasilicate, sodium metaphosphate, sodium tripolyphosphate, potassium chloride, potassium carbonate, potassium hydroxide, magnesium phosphate, magnesium silicate, calcium chloride, calcium acetate, calcium citrate, calcium propionate, calcium silicate, barium chloride, zirconium chloride, ferrous sulfate, nickel sulfate, ammonium hexafluorosilicate, aluminum chloride, aluminum acetate and aluminum hydroxide.

The water-soluble metal salt is used in the state dissolved in the dyeing bath in an amount of 1 to 2% (W/W %), preferably 3 to 5% (W/W %), based on the chitosan (including D-glucosamine) differing in the molecular weight, which is used according to the intended object.

When a water-soluble metal salt is dissolved in the dyeing bath, the dyeing bath becomes acidic in the case of a certain kind of the water-soluble metal salt, and in this case, when a water-insoluble chitosan is used, sometimes the water-soluble chitosan is dissolved to form a gel. Also in this case, however, a novel finely divided black coloring material can be obtained by treating the gel directly with the lithospermum root dyestuff and bringing the obtained black gelatinous material into contact with an aqueous alkali solution, or forming a black film of the obtained black gelatinous material and pulverizing the film.

If the treatment is carried out in the presence of a water-soluble metal salt in the above-mentioned manner, even when a chitosan having a low degree of deacetylation is used, a deep neat black color capable of absorbing rays of the entire visible region (380 to 780 nm) is obtained, and a black coloring material, black fiber or modified black iron oxide having a low lightness comparable to that of carbon black can be obtained.

The present invention will now be described in detail with reference to the following examples.

Each of the decomposition temperatures shown in the examples is determined by a differential scanning calorimeter (Model DSC-300 supplied by Seiko Instruments Inc.).

The diffusion reflectance spectrum of each of the samples obtained in the examples is determined by a visible-ultraviolet spectrophotometer using an integrating sphere (Model Ubest 50 supplied by Nippon Bunko Kogyo).

PREPARATION OF LITHOSPERMUM ROOT DYESTUFF EXTRACT SOLUTION

The lithospermum root dyestuff obtained by the solvent extraction of a root of the gromwell was prepared in the following manner.

EXTRACT SOLUTION PREPARATION EXAMPLE 1

A stainless steel lidded cylindrical vessel having an inner volume of 20 l was charged with 1 kg of a finely divided dry gromwell root according to the pharmacopeia (gromwell root produced in China; crude drug), 5 l of ethyl alcohol having a purity of 99.5% was added as the extraction solvent, and the mixture was allowed to stand at room temperature for 3 days without sealing the vessel. Then the mixture was filtered to obtain 4,410 ml of an ethyl alcohol extract solution having a dense reddish violet color.

Thereafter, 300 ml of the extract solution was taken and concentrated by removing ethyl alcohol by distillation under a reduced pressure to obtain 3.2 g of a lithospermum root dyestuff extract (concentrate) in the form of a dense reddish violet syrup.

The content of the lithospermum root dyestuff extract in the ethyl alcohol extract solution was 1.07% (W/V %), and the amount of the lithospermum dyestuff extract obtained from the used dry lithospermum root (gromwell root) was 4.70% (W/W %).

EXTRACT SOLUTION PREPARATION EXAMPLE 2

The extraction of the lithospermum root dyestuff was carried out in the same manner as described in Extract Solution Example 1 except that n-butyl alcohol was used instead of ethyl alcohol. Then, 4.78 g of a lithospermum root dyestuff extract (concentrate) was obtained from 500 ml of the obtained n-butyl alcohol extraction solution.

The content of the lithospermum dyestuff extract in the n-butyl alcohol extraction solution was 0.95% (W/V %), and the amount of the lithospermum root dyestuff extract obtained from the used dry lithospermum root was 4.56% (W/W %).

PURIFICATION OF LITHOSPERMUM ROOT DYESTUFF EXTRACT

The purification for separating and recovering a lithospermum dyestuff component alone, by removing impurities from the lithospermum root dyestuff extract obtained from the gromwell root, was carried out in the following manner.

LITHOSPERMUM ROOT DYESTUFF EXTRACT PURIFICATION EXAMPLE 1

A column fabricated by wet-filling 200 g of a silica gel (Kieselgel 60 supplied by Merck; 70 to 230 mesh) into a glass column having a diameter of 45 mm and a length of 750 mm was charged with 20 g of a lithospermum root dyestuff extract (concentrate) in the form of a dense reddish violet syrup obtained in the same manner as described in Extract Solution Preparation Example 1, and a development was carried out by using chloroform as the eluent. Fractions of eluates having a red color were combined and the mixture was concentrated under a reduced pressure to obtain 7.2 g of a dark red syrup.

LITHOSPERMUM ROOT DYESTUFF EXTRACT PURIFICATION EXAMPLE 2

In 200 ml of toluene was dissolved 20 g of a lithospermum root dyestuff extract (concentrate) in the form of a dense reddish violet syrup prepared in the same manner as described in Extract Solution Preparation Example 1, 10 g of FLORISIL (activated magnesium silicate supplied by Florisil Co.) was added to the solution, and the mixture was stirred at room temperature for 1 hour. Then the mixture was filtered and the filtrate was concentrated under a reduced pressure to obtain 8.6 g of a dark scarlet syrup.

METHOD OF MEASURING DEACETYLATION DEGREE OF CHITOSAN

The deacetylation degree of the chitosan used in the present invention is measured according to the IR spectrum method and the colloid titration method.

An example of the measurement of the deacetylation degree will now be described below.

EXAMPLE OF MEASUREMENT OF DEACETYLATION DEGREE

In 99.5 ml of a 0.5% aqueous acetic acid solution was dissolved 500 mg of a commercially available chitosan (Chitosan PSL supplied by Yaizu Suisankagaku Industry Co., Ltd., white powder). Then 1 g of the solution was charged in an Erlenmeyer flask having an inner volume of 200 ml, 30 ml of water was added, and the mixture was thoroughly stirred. Two or three drops of a 0.1% solution of Methylene Blue were added as the indicator and the titration was carried out by 1/400N polyvinyl potassium sulfate. At a titration amount of 9.1 ml, the color of the indicator changed from blue to violet and this point was designated as the end point.

When the deacetylation degree was determined from the titration value according to the following calculation formula, it was found that the deacetylation degree of the chitosan used as the sample was 78.1%:

$$\text{Deacetylation degree} = \frac{\frac{X}{161}}{\frac{X}{161} + \frac{Y}{203}} \times 100\%$$

$$X = \frac{1}{400} \times \frac{1}{1000} \times f \times 161 \times V$$

$$Y = 0.5 \times \frac{1}{100} - X$$

wherein V represents the titration value (ml) of 1/400N polyvinyl potassium sulfate and f represents the titer of 1/400N polyvinyl potassium sulfate.

PREPARATION OF HIGHLY DEACETYLATED CHITOSAN

Of chitosans used in the present invention, a chitosan having a high deacetylation degree can be prepared by further deacetylating a usually available chitosan. An example of the deacetylation process will now be described below. Furthermore, a chitosan can be prepared from chitin according to the process described below.

HIGHLY DEACETYLATED CHITOSAN PREPARATION EXAMPLE (1) A three-neck round-bottom flask equipped with a thermometer and a stirrer and having a capacity of 2,000 ml was charged with 1,700 g of a 48% (W/W %) aqueous sodium hydroxide solution, 100 g of a chitosan (Chitosan PSL supplied by Yaizu Suisankagaku Ind. Co., Ltd.; decomposition temperature=267.7° C.) was added, and the mixture was heated at 85° C. with stirring for 1 hour and 30 minutes to effect deacetylation. After the termination of the heating with stirring, the mixture was naturally cooled and filtered, and the thus-obtained chitosan was charged into a beaker having a capacity of 2,000 ml. Then 1,500 ml of water was added to the chitosan and the mixture was stirred for 1 hour while maintaining the mixture at 80° C. The mixture was then filtered, and the recovered chitosan washed with water until the filtrate became neutral.

(2) Then 95 g of the washed chitosan was deacetylated with an aqueous solution of sodium hydroxide in the same manner as described above in (1). The recovered chitosan was washed with water until the filtrate became neutral, and the chitosan was air-dried and pulverized in a mortar to obtain 89 g of highly deacetylated chitosan in the form of a white fine powder (decomposition temperature=235.1° C.).

According to the method described in Example of Measurement of Deacetylation Degree, the deacetylation degree of the highly deacetylated chitosan obtained by carrying out the deacetylation two times was measured, and it was found that the deacetylation degree of the highly deacetylated chitosan was 98.1%. When the deacetylation degree of the chitosan (Chitosan PSL supplied by Yaizu Suisankagaku Ind. Co., Ltd.) used as the starting material was similarly measured, it was found that the deacetylation degree of the chitosan was 78.1%.

EXAMPLE 1

A three-neck round-bottom flask equipped with a reflux condenser, a thermometer and a stirrer and having a capacity of 500 ml was charged with 200 ml of water, and a solution of 2 g of a lithospermum dyestuff extract prepared in the same manner as described in Extract Solution Preparation Example 1 in 200 ml of ethyl alcohol was added into the flask to form a dyeing bath. The pH value of the dyeing bath was 4.6. Then, 20 g of a white powdery chitosan (Chitosan PSL supplied by Yaizu Suisankagaku Ind. Co., Ltd.; deacetylation degree=78.1%) was incorporated into the dyeing bath, and the dyeing bath was heated and refluxed at 85° to 90° C. with stirring for 1 hour. The pH value of the dyeing bath was 6.9.

After the heating and refluxing, the blackened chitosan was recovered, dried, and pulverized in a mortar to obtain 23.8 g of a finely divided black coloring material (decomposition temperature=237.8° C.).

The spectral reflectance spectrum of the obtained black coloring material is shown in FIG. 1. Although a reflection of higher than 10% was observed in a long wavelength region of 650 nm or more, this reflection was greatly reduced by repeating the dyeing several times.

EXAMPLE 2

The procedures of Example 1 were repeated in the same manner except that a highly deacetylated chitosan (deacetylation degree=98.1%) prepared in the same manner as described in Highly Deacetylated Chitosan Preparation Example was used instead of the chitosan used in Example 1, whereby 23.7 g of a finely divided black coloring material (decomposition temperature=237.4° C.) was obtained.

Figure 2:
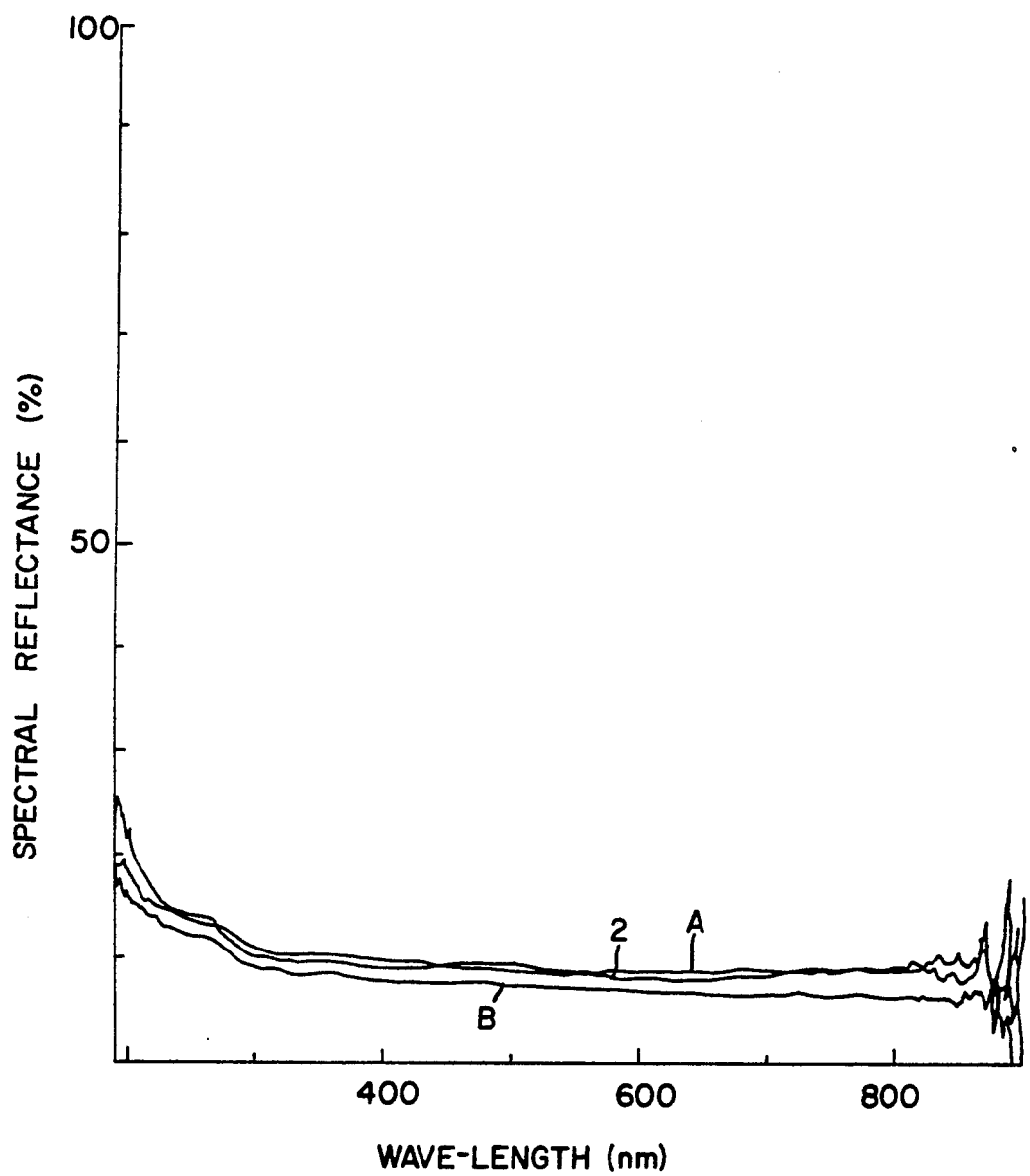

The obtained black coloring material had a black color with a low lightness. The spectrum reflectance spectrum of the obtained black coloring material is shown in FIG. 2. It was confirmed that at least 90% of rays in the entire visible region (380 nm to 780 nm) were absorbed.

EXAMPLE 3

(1) A beaker having a capacity of 1 l was charged with 500 ml of water and 15 g of acetic acid was dissolved therein to form a 3% aqueous acetic acid solution. Then, 10 g of a chitosan (Chitosan PSL supplied by Yaizu Suisankagaku Ind. Co., Ltd.; deacetylation degree=78.1%) was dissolved in 500 ml of the obtained 3% aqueous acetic acid solution to form a chitosan acetate.

(2) A three-neck round-bottom flask equipped with a reflux condenser, a thermometer and a stirrer and having an inner volume of 500 ml was charged with 300 g of the chitosan acetate prepared in (1) above, and 10 ml of a 10% ethyl alcohol solution of the lithospermum extraction dyestuff purified according to Lithospermum Dyestuff Extract Purification Example 1 was added. The mixture was heated and refluxed at 85° to 90° C. for 2 hours with stirring. The pH value of the dyeing bath was 4.4. The chitosan acetate in the dyeing bath was blackened, and the dyeing bath was naturally cooled to obtain 298.5 g of a gelatinous black coloring material.

(3) A 1-liter beaker was charged with 500 ml of water and 50 g of sodium hydroxide was dissolved therein to prepare a 10% aqueous sodium hydroxide solution. Then 200 g of the gelatinous black coloring material obtained in (2) above was added dropwise to the above aqueous solution at room temperature with vigorous stirring.

As soon as the gelatinous black coloring material was added dropwise, a black solid was precipitated, and after completion of the dropwise addition of all of the gelatinous black coloring material, stirring was further conducted for 30 minutes. The precipitated black solid was recovered by filtration, washed with water, dried at 50° to 55° C. and pulverized to obtain 3.6 g of a finely divided black coloring material (decomposition temperature=246.4° C.).

Figure 3:
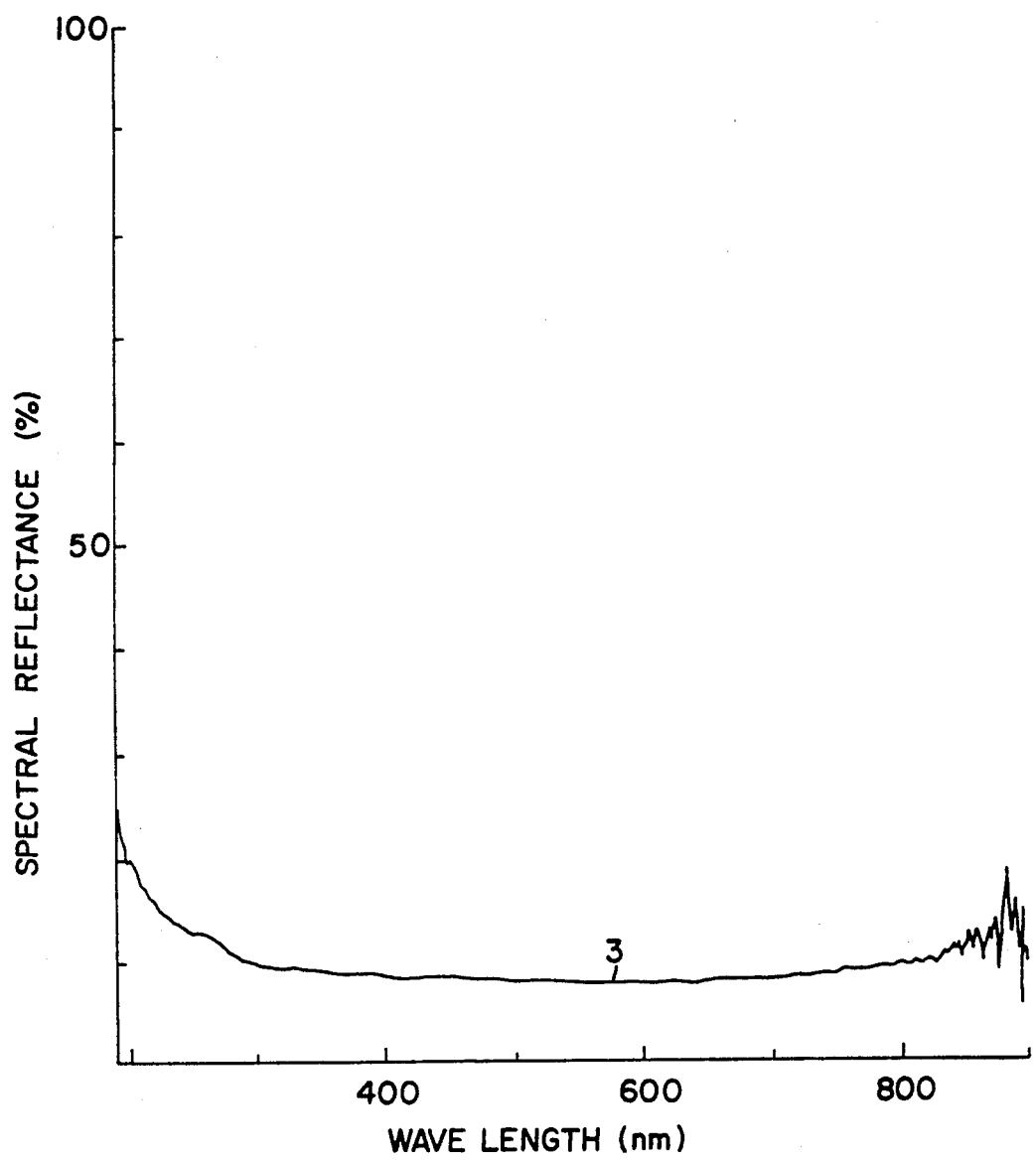

The obtained black coloring material had no smell and showed a black color of a low lightness. The spectral reflectance spectrum of the obtained black coloring material is shown in FIG. 3. It was confirmed that at least 90% of rays in the entire visible region (380 to 780 nm) were absorbed.

EXAMPLE 4

The procedures of Example 3 were repeated in the same manner except that malic acid was used instead of acetic acid, whereby 3.7 g of a finely divided black coloring material (decomposition temperature=274.6° C.) was obtained.

The obtained black coloring material showed a black color of a low lightness, and when the spectral reflectance was measured, it was confirmed that about 90% of rays in the entire visible region (380 nm to 780 nm) were absorbed.

EXAMPLE 5

The procedures of Example 3 were repeated in the same manner except that citric acid was used instead of acetic acid, whereby 3.7 g of a finely divided black coloring material (decomposition temperature=281.1° C.) was obtained.

The obtained black coloring material showed a black color having a low lightness, and when the spectral reflectance was measured, it was confirmed that about 90% of rays in the entire visible region (380 nm to 780 nm) were observed.

EXAMPLE 6

(1) A 300-ml beaker was charged with 100 ml of water and 0.3 g of aluminum acetate was dissolved therein. The pH value of this aqueous aluminum acetate solution was 3.7.

Then, 10 g of a chitosan (Chitosan PSL supplied by Yaizu Suisankagaku Ind. Co., Ltd.; deacetylation degree=78.1%) was, incorporated into the aqueous aluminum acetate solution and the mixture was gently stirred at 40° to 45° C. for 30 minutes. The treated chitosan was recovered by filtration and air-dried. The pH value after the addition of the chitosan was 6.6.

(2) A three-neck round-bottom flask equipped with a reflux condenser, a thermometer and a stirrer and having an inner volume of 500 ml was charged with 100 ml of water and 90 ml of ethyl alcohol, and 10 ml of a 10% ethyl alcohol solution of the lithospermum root extraction dyestuff purified according Lithospermum Root Dyestuff Extract Purification Example 1 was added thereto to form a dyeing bath. The pH value of the obtained dyeing bath was 5.4. Then the entire amount of the chitosan treated with the aqueous aluminum acetate solution in (1) above was added to the mixture, and the mixture was heated at 70° to 75° C. with stirring to blacken the chitosan in the dyeing bath. After the heating, the blackened chitosan was separated and recovered, air-dried and pulverized to obtain 10.7 g of a finely divided black coloring material (decomposition temperature=232.9° C.).

Figure 4:
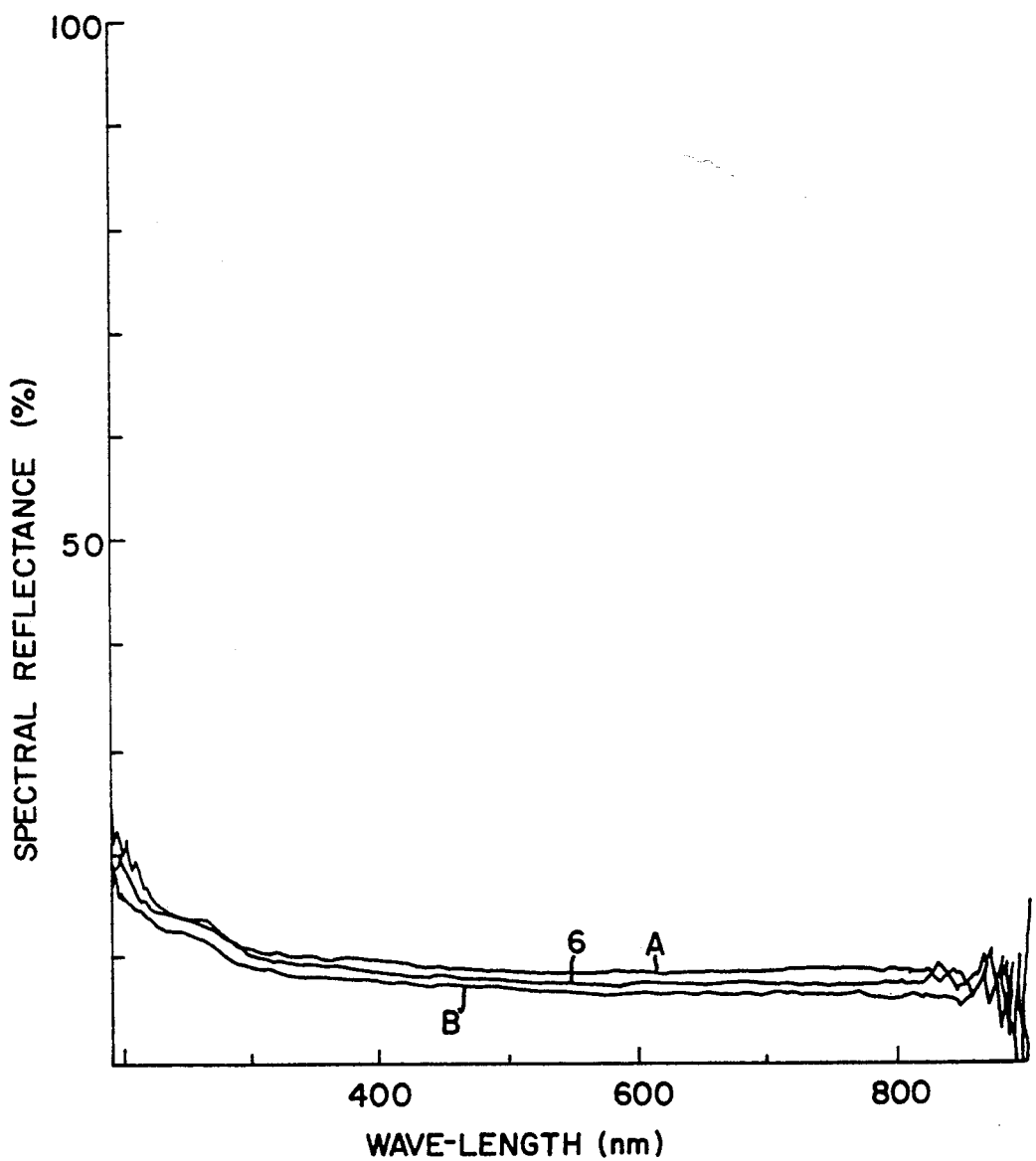

The obtained black coloring material showed a deep neat black color. The spectral reflectance spectrum of the obtained black coloring material is shown in FIG. 4. It was confirmed that at least 92% of rays in the entire visible region (380 nm to 780 nm) were absorbed.

EXAMPLE 7

The procedures of Example 6 were repeated in the same manner except that potassium chloride was used instead of aluminum acetate used in Example 6, whereby 10.2 g of a finely divided black coloring material (decomposition temperature=247.6° C.) was obtained.

Figure 5:
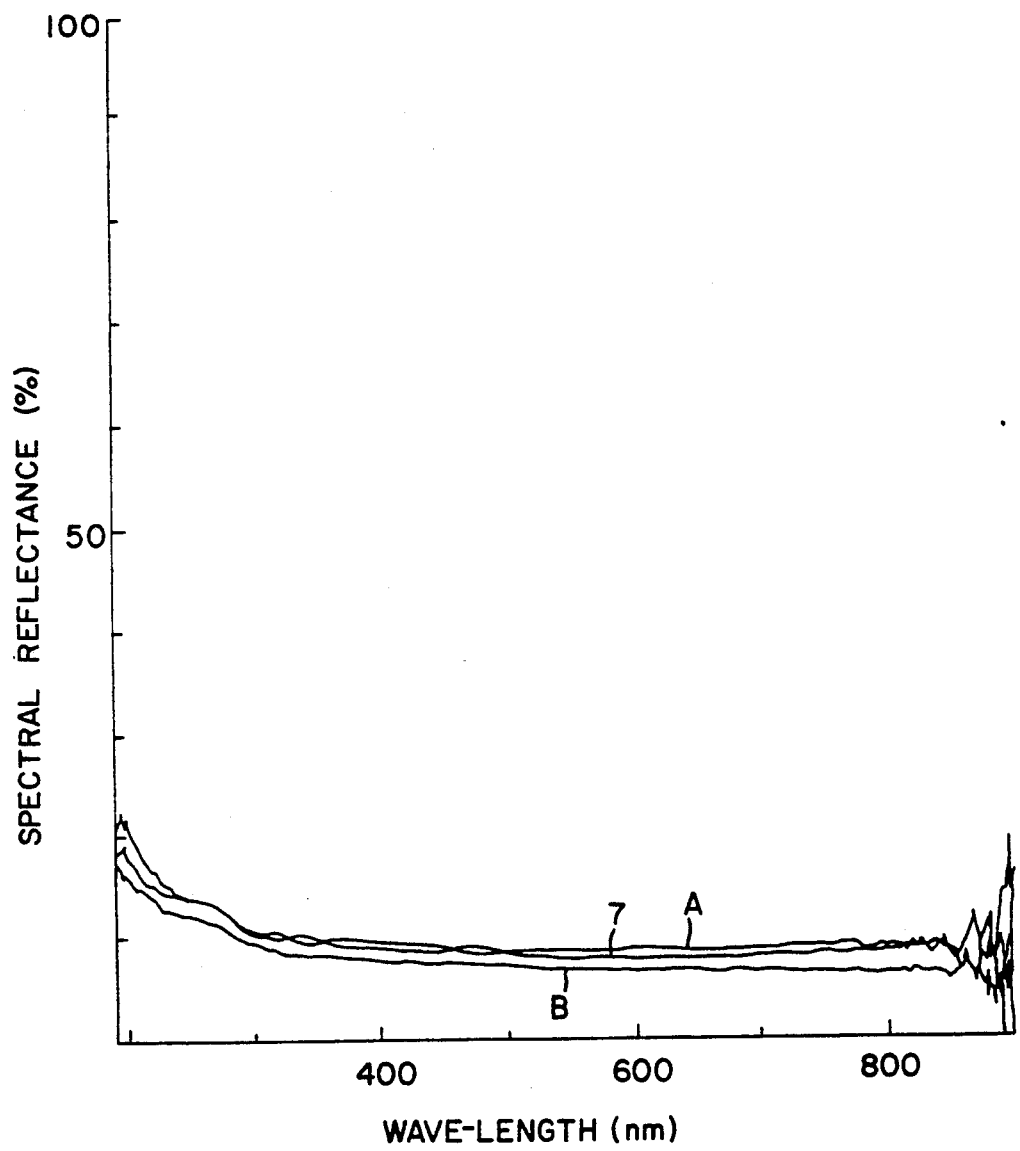

The obtained black coloring material showed a deep neat black color. The spectral reflectance spectrum of the obtained black coloring material is shown in FIG. 5. It was confirmed that at least 90% of rays in the entire visible region (380 nm to 780 nm) were absorbed.

EXAMPLE 8

The procedures of Example 6 were repeated in the same manner except that calcium acetate was used instead of aluminum acetate used in Example 6, whereby 10.6 g of a finely divided black coloring material (decomposition temperature=251.0° C.) was obtained.

The obtained black coloring material showed a deep neat black color. When the spectral reflectance was measured, it was confirmed that at least 90% of rays in the entire visible region (380 to 780 nm) were absorbed.

EXAMPLE 9

The procedures of Example 6 were repeated in the same manner except that nickel sulfate was used instead of aluminum acetate used in Example 6, whereby 10.3 g of a finely divided black coloring material (decomposition temperature=247.6° C.) was obtained.

The obtained black coloring material showed a deep neat black color. When the spectral reflectance was measured, it was confirmed that at least about 90% of rays in the entire visible region (380 to 780 nm) were absorbed.

EXAMPLE 10

The procedures of Example 6 were repeated in the same manner except that barium chloride was used instead of aluminum acetate used in Example 6, whereby 10.7 g of a finely divided black coloring material (decomposition temperature=249.3° C.) was obtained.

The obtained black coloring material showed a deep neat black color. When the spectral reflectance was measured, it was confirmed that at least about 90% of rays in the entire visible region (380 to 780 nm) were absorbed.

EXAMPLE 11

A three-neck round-bottom flask equipped with a reflux condenser, a thermometer and a stirrer and having an inner volume of 500 ml was charged with 200 ml of water, and 2 g of a water-soluble chitosan prepared by the enzyme decomposition (Water-soluble Chitosan supplied by K. I. Chemical Industry Co., Ltd.; maximum molecular weight=10,000 and deacetylation degree=60 to 90%) was dissolved therein. Then, 10 g of a nylon 12 powder (SP-500 supplied by Toray; particle diameter=7 μm) was incorporated into the solution and the mixture was heated at 60° to 65° C. with stirring for 20 minutes.

Then, 1 g of shikonin obtained by the cell culture of a gromwell (supplied by Mitsui Petrochemical Co.) was dissolved in 50 ml of ethyl alcohol, the entire solution was incorporated into the flask, and the mixture was heated and refluxed at 80° to 85° C. with stirring for 1 hour. The pH value of the obtained dyeing solution was 7.4. The nylon 12 in the dyeing bath was blackened. After the heating and refluxing, the fine powder of the blackened nylon 12 was recovered and dried at 50° to 55° C. to obtain 11.2 g of a finely divided black coloring material (decomposition temperature=180.9° C.).

Figure 6:
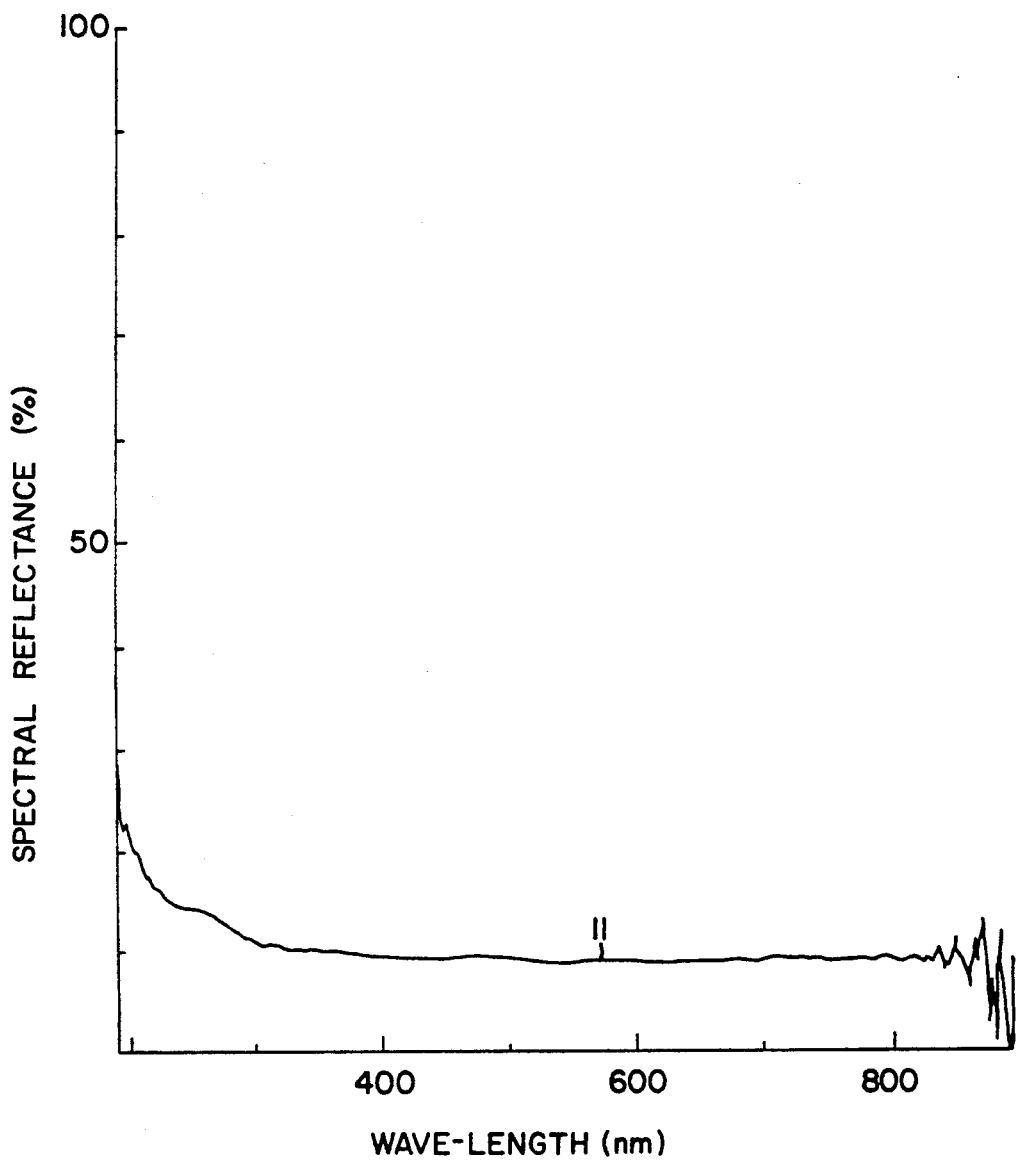

The obtained black coloring material showed a deep black color. The spectral reflectance spectrum of the obtained black coloring material is shown in FIG. 6. It was confirmed that at least 90% of rays in the entire visible region (380 to 780 nm) were absorbed.

EXAMPLE 12

The procedures of Example 11 were repeated in the same manner except that a nylon 6 powder was used instead of the nylon 12 powder used in Example 11 and the 10% ethyl alcohol solution of the lithospermum root extraction dyestuff purified according to Lithospermum Root Dyestuff Extract Purification Example 1 was used instead of shikonin used in Example 11, whereby 11.1 g of a finely divided black coloring material (decomposition temperature=178/7° C.) was obtained.

The obtained black coloring material had a deep black color. When the spectral reflectance was measured, it was found that at least about 90% of rays in the entire visible region (380 nm to 780 nm) were absorbed.

EXAMPLE 13

The procedures of Example 11 were repeated in the same manner except that finely divided polyethylene (Flow Bead CL-208 supplied by Seitetsu Kagaku; particle diameter distribution=3 to 20 μm) was used instead of the nylon 12 powder used in Example 11, whereby 10.9 g of a finely divided black coloring material was obtained.

The obtained black coloring material showed a black color. When the spectral reflectance was measured, it was confirmed that about 90% of rays in the entire visible region (380 nm to 780 nm) were absorbed.

EXAMPLE 14

The procedures of Example 11 were repeated in the same manner except that finely divided polypropylene was used instead of the nylon 12 powder used in Example 11, whereby 11.2 g of a finely divided black coloring material was obtained.

The obtained black coloring material showed a black color. When the spectral reflectance was measured, it was confirmed that about 90% of rays in the entire visible region (380 nm to 780 nm) were absorbed.

EXAMPLE 15

The procedures of Example 11 were repeated in the same manner except that a finely divided crosslinked polyester (supplied by Shiraishi Kogyo; particle diameter=5 μm) was used instead of the nylon 12 powder used in Example 11, whereby 10.9 g of a finely divided black coloring material was obtained.

The obtained black coloring material showed a black color. When the spectral reflectance was measured, it was confirmed that about 90% of rays in the entire visible region (380 nm to 780 nm) were absorbed.

EXAMPLE 16

The procedures of Example 11 were repeated in the same manner except that a silk powder (silk protein) (KANEBO SILK POWDER H supplied by Kanebo Kenshi Kyobijin; average particle diameter=6 to 7 μm) was used instead of the nylon 12 powder used in Example 11, whereby 11.0 g of a finely divided black coloring material was obtained.

The obtained black coloring material showed a black color. When the reflectance spectrum was measured, a reflection exceeding 10% was observed in a long wavelength region of 600 nm or more, but this reflection was reduced by repeating the dyeing several times.

EXAMPLE 17

The procedures of Example 11 were repeated in the same manner except that a cellulose powder (Avicel PH-M06 supplied by Asahi Chemical Industries Co.) was used instead of the nylon 12 powder used in Example 11, whereby 11.6 g of a finely divided black coloring material was obtained.

The obtained black coloring material showed a black color. When the spectral reflectance was measured, it was confirmed that about 90% of rays in the entire visible region (380 nm to 780 nm) were absorbed.

EXAMPLE 18

(1) A 1-liter beaker was charged with 500 ml of water and 15 g of malic acid to dissolve malic acid, and 5 g of a highly deacetylated chitosan (deacetylation degree=98.1%) prepared according to Highly Diacetylated Chitosan Preparation Example was incorporated with stirring and dissolved in the solution to form a chitosan malate.

Then 1.5 g of a silk fabric having a size of 100 mm × 100 mm was immersed in the solution and boiled for 30 minutes. Then the solution was naturally cooled and the silk fabric was taken out, squeezed, and air-dried.

(2) Then a 500-ml beaker was charged with 200 ml of water, and 10 ml of the 10% ethyl alcohol solution of the lithospermum root extraction dyestuff purified according to Lithospermum Root Dyestuff Extract Purification Example 1 was incorporated into water to form a dyeing bath. Then the silk fabric treated with the chitosan malate in (1) above was immersed in the dyeing bath, and the dyeing bath was heated at 85° to 95° C. for 30 minutes while the dyeing bath was gently stirred, whereby the silk fabric in the dyeing bath was dyed black. The dyed fabric was washed with hot water and air-dried to obtain a black fiber.

The obtained black fiber was evenly dyed black and had an excellent light fastness.

Figure 7:
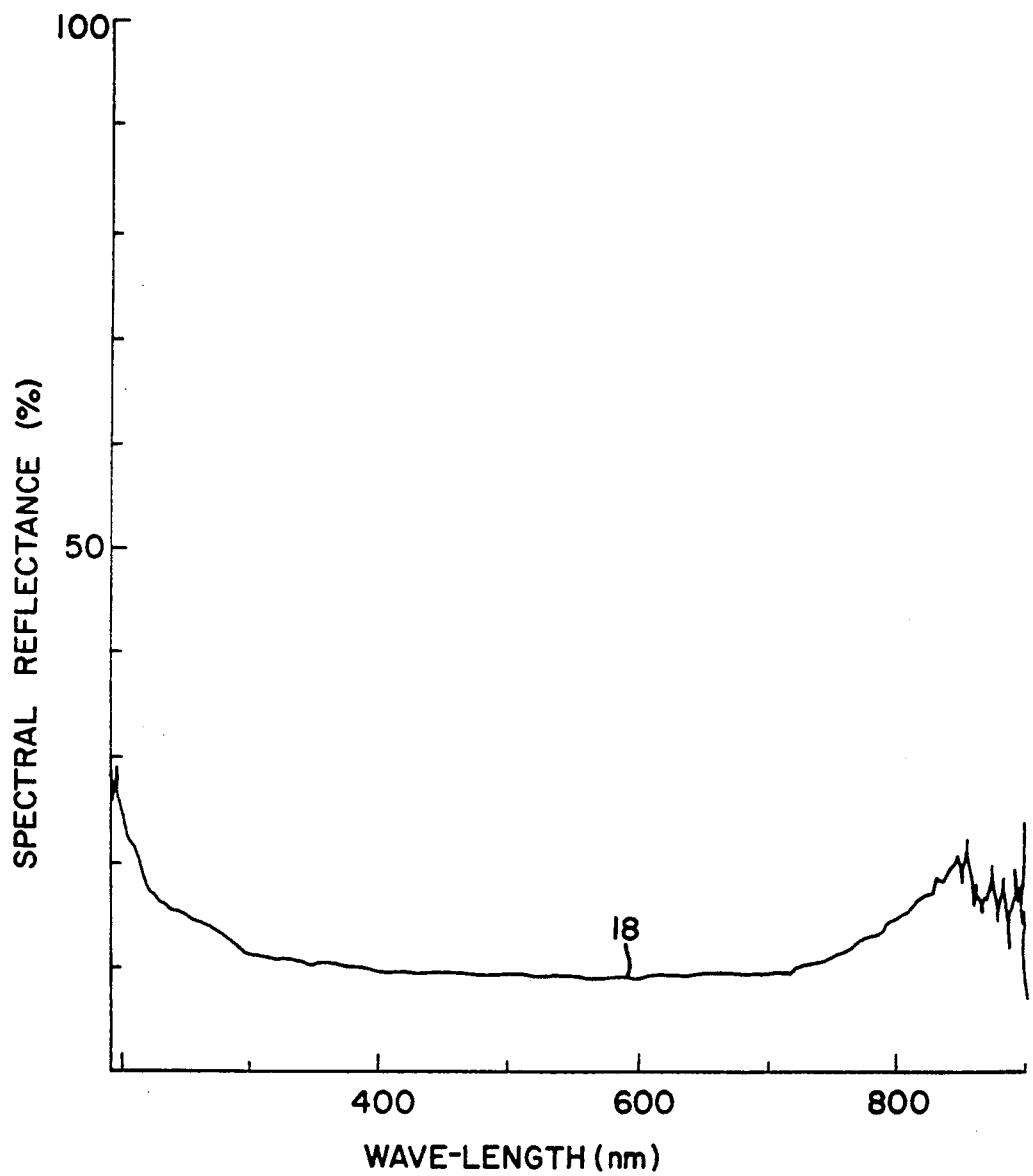

The spectral reflectance spectrum of the obtained black fiber is shown in FIG. 7. It was confirmed that at least 90% of rays in the entire visible region (380 nm to 780 nm) were absorbed.

EXAMPLE 19

A 500-ml beaker was charged with 200 ml of water, and 2 g of a water-soluble chitosan prepared by the enzyme decomposition (Water-Soluble Chitosan supplied by K. I. Chemical Industry Co., Ltd.; maximum molecular weight=10,000 and deacetylation degree=60 to 90%) was dissolved therein. Then, 5 g of a wool fiber cut into 3 to 5 mm was incorporated into the solution and the mixture was heated and stirred at 55° to 60° C. for 30 minutes.

Then 1 g of shikonin obtained by the cell culture of a gromwell (supplied by Mitsui Petrochemical Co.) was dissolved in 50 ml of ethyl alcohol and the entire solution was added into the beaker, and the mixture was heated at 87° to 89° C. with gentle stirring for 1 hour, whereby the wool in the dyeing bath was dyed black. The wool dyed in black was taken out, lightly squeezed, washed with hot water and dried to obtain a black fiber.

Figure 8:
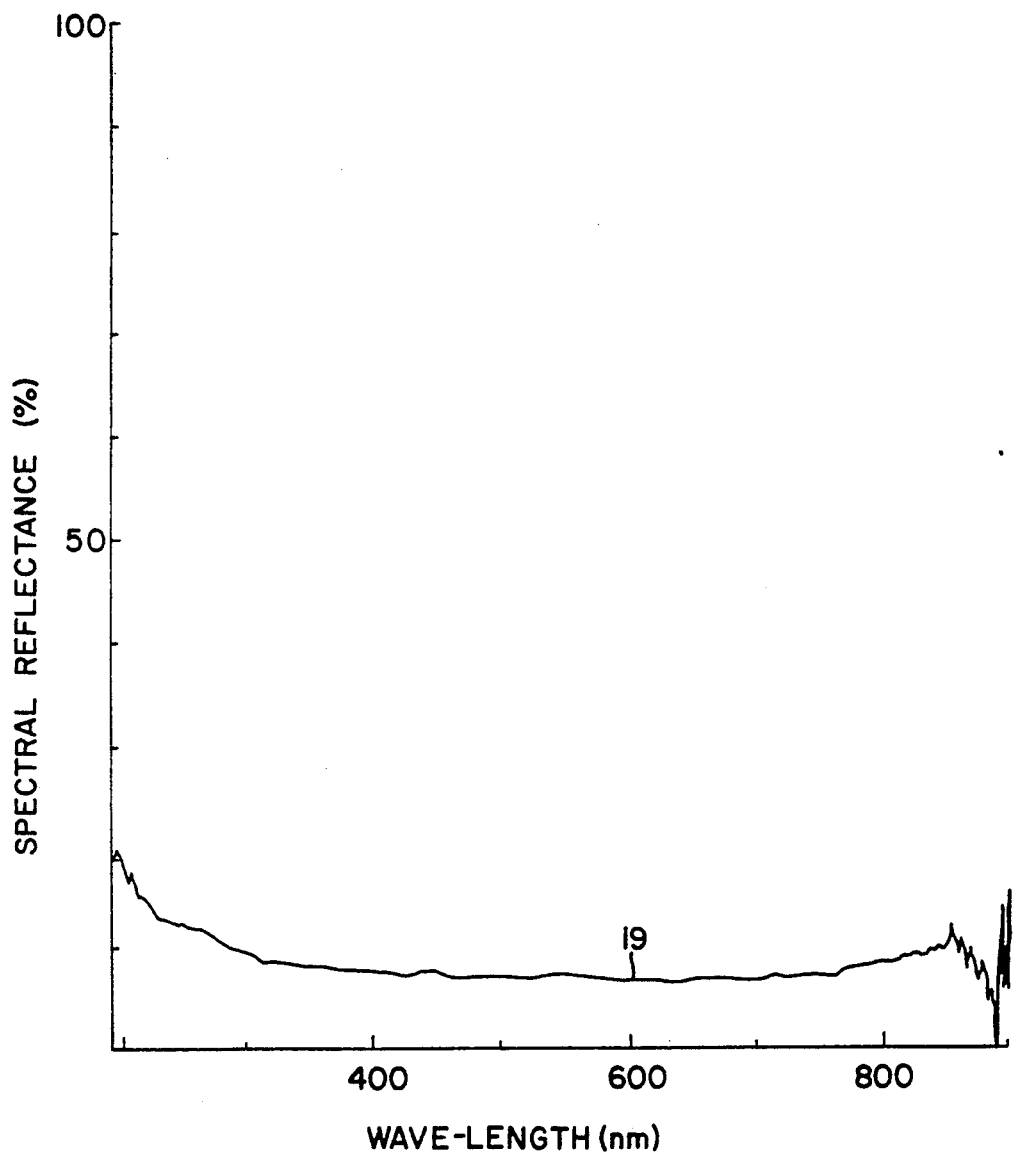

The obtained black coloring material showed a dense black color. The spectral reflectance spectrum of the obtained black coloring material is shown in FIG. 8. It was confirmed that at least 92% of rays in the entire visible region (380 nm to 780 nm) were absorbed.

EXAMPLE 20

A three-neck round-bottom flask equipped with a reflux condenser, a thermometer and a stirrer and having an inner volume of 500 ml was charged with 200 ml of water, and 2 g of a water-soluble chitosan prepared by the enzyme decomposition (Water-Soluble Chitosan supplied by K. I. Chemical Industry Co., Ltd.; maximum molecular weight=10,000 and deacetylation degree=60 to 90%) was dissolved therein. Then, 10 g of finely divided black iron oxide (Mapico Black BL-100 supplied by Titanium Kogyo) was added into the solution, and the mixture was heated and stirred at 60° to 65° C. for 20 minutes.

Then 1 g of shikonin prepared by the cell culture of a gromwell (supplied by Mitsui Petrochemical Co.) was dissolved into 50 ml of ethyl alcohol, the entire solution was added into the flask, and the mixture was heated and refluxed at 80° to 85° C. with stirring for 1 hour. After the heating and refluxing, black iron oxide was separated and dried at 50° to 55° C. to obtain 10.2 g of a finely divided modified black coloring material.

Figure 9:
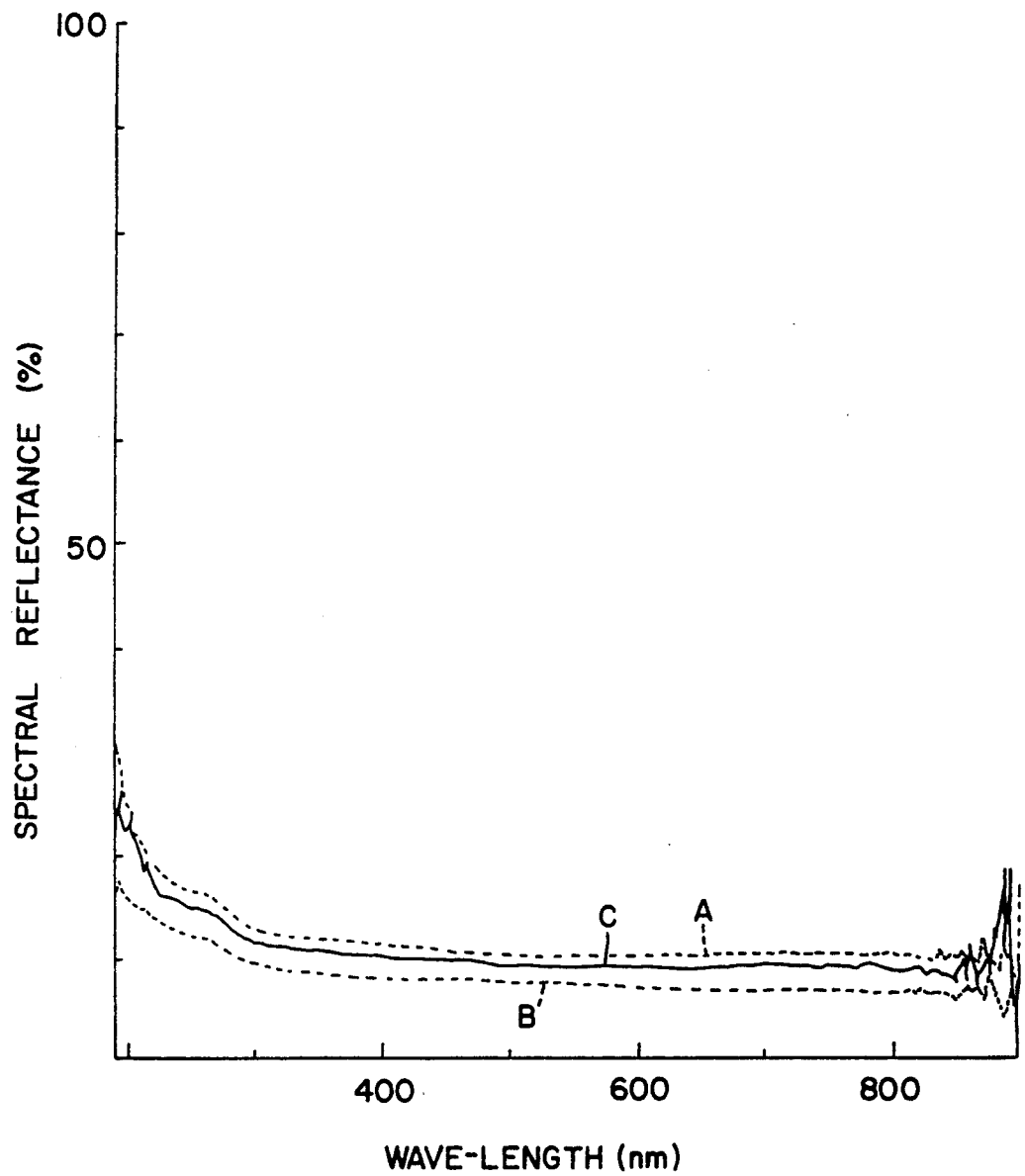

The thus modified black iron oxide had a blackness increased over the blackness before the treatment. The spectral reflectance spectra of the black iron oxide before and after the treatment are shown in FIGS. 9-A and 9-C, respectively. It was confirmed that at least about 95% of rays in the entire visible region (380 nm to 780 nm) were absorbed and the black iron oxide had a black color with a lightness closer to that of the black color of carbon black.

LIGHT FASTNESS TEST

The black coloring material of the present invention, prepared in the same manner as described in Example 2, was placed in a quartz Petri dish and exposed to direct rays of the sun for about 10 months from Oct. 24, 1988 to Aug. 23, 1989.

Figure 10:
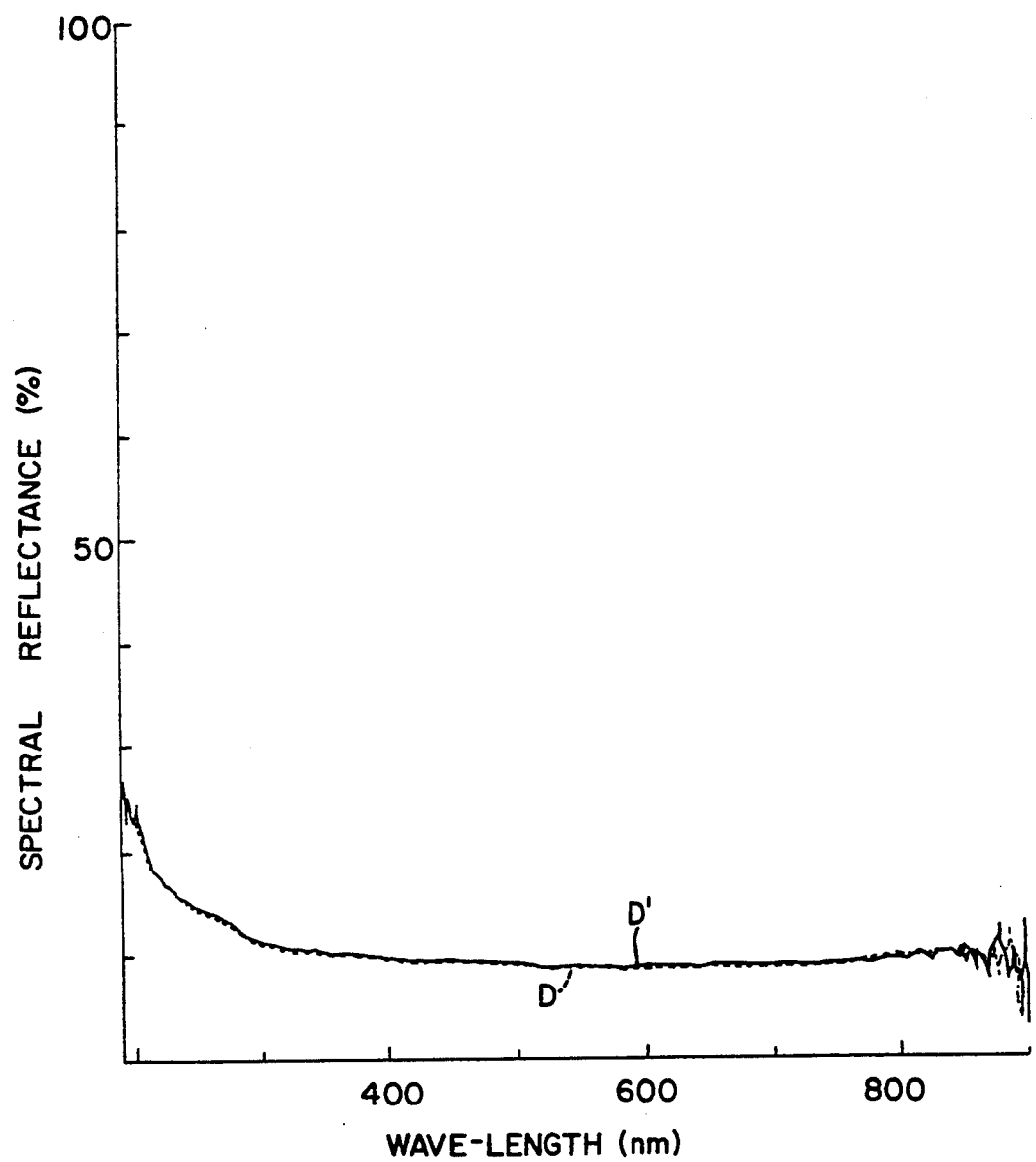

The spectral reflectance spectra before and after the light exposure are shown in FIGS. 10-D and 10-D', respectively. It was confirmed that both of the spectra were in complete agreement with each other, no color fading occurred and the black coloring material of the present invention had an excellent sun light fastness.

PULVERIZATION TEST

Figure 11:
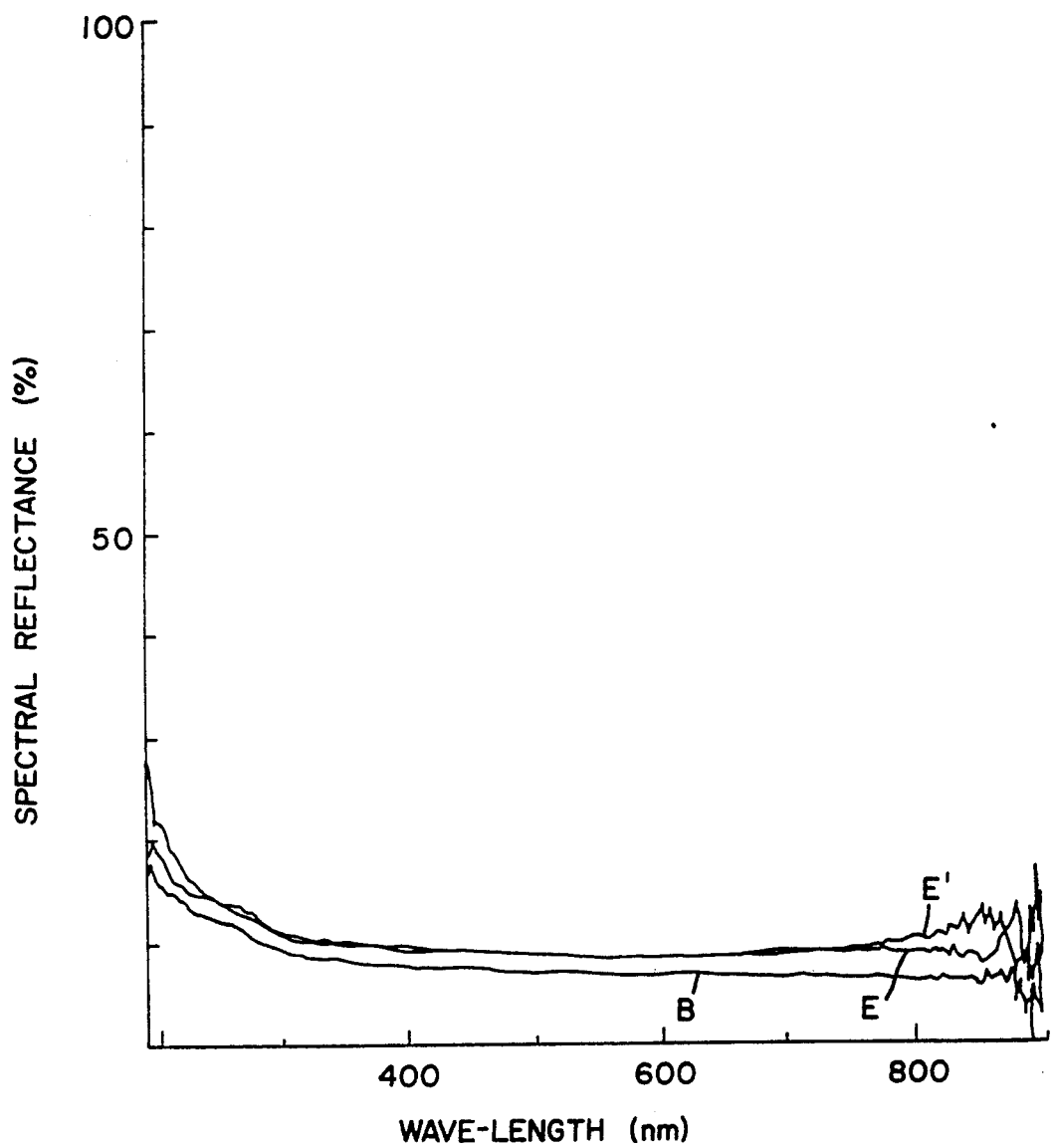

The black coloring material of the present invention, prepared in the same manner as described in Example 2, was pulverized by using a paint shaker (wet pulverization), and the spectral reflectance spectra before and after the pulverization to 61 $\mu$m were determined, which are shown in FIGS. 11-E and 11-E', respectively. It was confirmed that no whitening was caused at all by fine pulverization in the black coloring material of the present invention.

PRODUCTION EXAMPLE 1

Production of Mascara

A mascara was produced according to the following recipe:

| | |
|---|---|
| (1) Propylene glycol | 3 parts by weight |
| (2) Polyvinyl alcohol | 2 parts by weight |
| (3) Colloidal hydrous magnesium aluminosilicate | 1 part by weight |
| (4) Black coloring material of present invention prepared in Example 2 | 15 parts by weight |
| (5) Titanium oxide | 2 parts by weight |
| (6) Triethanolamine | 2 parts by weight |
| (7) Stearic acid | 3 parts by weight |
| (8) Bleached bees wax | 7 parts by weight |
| (9) Cetyl alcohol | 3 parts by weight |
| (10) Carnauba wax | 2 parts by weight |

According to the above-mentioned recipe, components (1) through (3) were added to 60 parts by weight of purified water and dissolved therein by heating at 80° C., and components (4) through (6) were homogeneously dispersed in the solution and components (7) through (10) were then emulsified therein Then, the emulsion was uniformly mixed, cooled to room temperature, and filled in a container to obtain a mascara product An appropriate amount of an antiseptic agent such as butyl p-hydroxybenzoate or methyl p-hydroxybenzoate can be added to the above-mentioned mascara product according to need.

PRODUCTION EXAMPLE 2

Production of Partial Hair Dye

A partial hair dye was prepared according to the following recipe:

| | |
|---|---|
| (1) Propylene glycol | 6 parts by weight |
| (2) Polyvinyl alcohol | 2 parts by weight |
| (3) Colloidal hydrous magnesium aluminosilicate | 1 part by weight |
| (4) Black coloring material of present invention prepared in Example 2 | 25 parts by weight |
| (5) Titanium oxide | 4 parts by weight |
| (6) Triethanolamine | 1.5 parts by weight |
| (7) Potassium hydroxide | 0.2 part by weight |
| (8) Stearic acid | 3 parts by weight |
| (9) Bleached bees wax | 7 parts by weight |

| (10) Cetyl alcohol | 3 parts by weight |
| (11) Carnauba wax | 2 parts by weight |

According to the above recipe, components (1) through (3) were dissolved in 25 parts by weight of purified water under heating at 80° C., and components (4) through (7) were uniformly dispersed in the solution and components (8) through (11) were emulsified in the dispersion. The emulsion was uniformly mixed and cooled to room temperature, and the cooled mixture was packed into a container to obtain a partial hair dye product An appropriate amount of an antiseptic agent such as butyl p-hydroxybenzoate or methyl p-hydroxybenzoate can be added to the above product according to need.

PRODUCTION EXAMPLE 3

Production of Black Urethane Film (1) In 100 ml of ethyl alcohol was dissolved 1 g of methylpolysiloxane, and 20 g of the black coloring material obtained in Example 2 was added to the solution and ethyl alcohol was removed under a reduced pressure with stirring to coat the black coloring material obtained in Example 2 with the methylpolysiloxane as a silicone oil.

(2) A 500-ml beaker was charged with 20 g of a urethane prepolymer (Prepolymer A supplied by Mitsui Toatsu Chemicals Inc.; solid content=20%, solvent=methyl ethyl ketone/toluene), and 0.5 g of the black coloring material obtained in (1) above was added thereto. The mixture was thoroughly stirred and thinly spread on a flat glass plate. The coated glass sheet was allowed to stand at room temperature for about 4 hours, and the coating was peeled from the glass plate to obtain a black urethane film.

Figure 12:
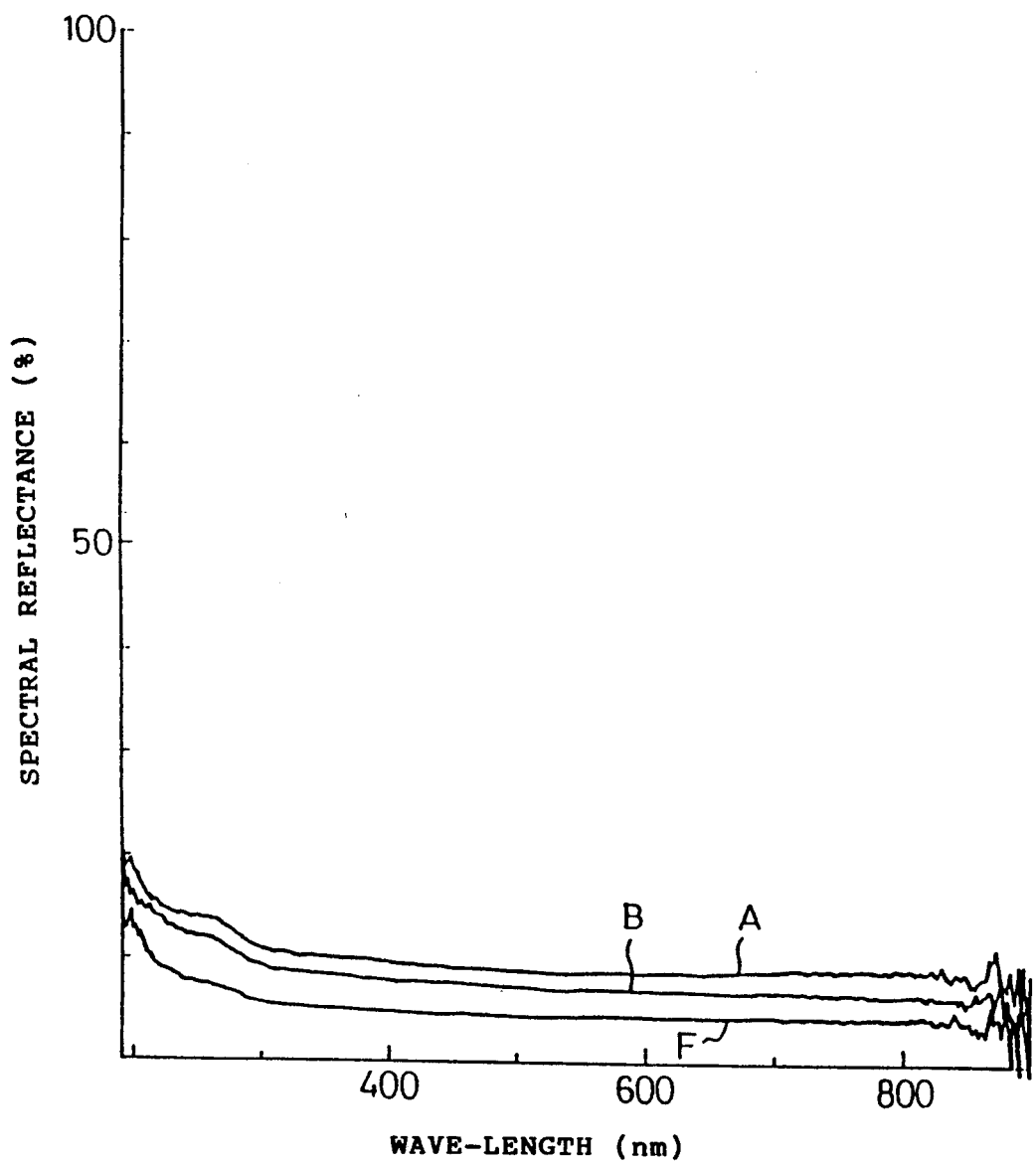

The obtained black urethane film was elastic. The spectral reflectance spectrum of this black urethane film is shown in FIG. 12-F. It was confirmed that about 95% of rays in the entire visible region (380 nm to 780 nm) were absorbed and the film had a blackness having a lightness lower than that of the blackness of carbon black.

PRODUCTION EXAMPLE 4

Production of Black Urethane Prepolymer

In the same manner as described in Production Example 3, the black coloring material coated in (1) of Production Example 3 was added to the urethane prepolymer, and the mixture was thoroughly stirred. Then, the mixture was poured into a glass Petri dish and allowed to stand at room temperature half a day, and the mixture was peeled from the dish to obtain a disk-shaped black elastomer having a thickness of about 2 mm.

PRODUCTION EXAMPLE 5

Production of Black Urethane Film

In the same manner as described in Production Example 3, a black urethane film was prepared by using the gelatinous black coloring material obtained in (2) of Example 3 instead of the black coloring material obtained in Example 2 in (2) of Production Example 3.

From the results of the organoleptic test of the mascara and partial hair dye prepared by using the black coloring material of the present invention, it was found that each of the mascara and partial hair dye had an excellent adhesion, impression, durability and finish, showed no irritation of the skin and had a black color which did not provide an incompatible feeling, and that each was an excellent makeup cosmetic heretofore unknown.

It also was confirmed that the black film-forming urethane material prepared by using the black coloring material of the present invention was a heretofore unknown film-forming material showing a black color having a lightness lower than that of the black color of carbon black.

INDUSTRIAL APPLICABILITY

According to the present invention, finely divided, gelatinous and liquid black coloring materials having a very low lightness comparable to that of carbon black can be obtained by treating chitosans differing in the molecular weight, including D-glucosamine, and salts thereof with a dyestuff of the lithospermum root.

If a powdery polymeric substance is treated with the black coloring material, a finely divided polymer-based black coloring material is obtained, and if a fiber is treated with the black coloring material of the present invention by a simple dip dyeing method, a black fiber having a low lightness is obtained The black coloring material of the present invention can be used in the fields where the conventional black coloring materials are used, and furthermore, since new functions are given to the black coloring material of the present invention, it is expected that the black coloring material will be used in other fields where the conventional black coloring materials have not been used.

We claim:

1. A process for the preparation of a black coloring agent, which comprises treating a chitosan with an extract of lithospermum root in an organic solvent.

2. A process for the preparation of a black coloring agent according to claim 1, wherein a water-insoluble chitosan is used as the chitosan to obtain said black coloring agent in a powder form.

3. A process for the preparation of a black coloring agent according to claim 1, wherein a gelatinous chitosan salt obtained by dissolving insoluble chitosan in an inorganic or organic acid is used as the chitosan to obtain said black coloring agent in gel form.

4. A process for the preparation of a black coloring agent according to claim 1, wherein a water-soluble chitosan, chitosan oligosaccharide or D-glucosamine, or an inorganic acid or organic acid salt thereof is used as the chitosan to obtain said black coloring agent in a liquid form.

5. A process for the preparation of a black coloring agent according to claim 1, wherein the treatment is carried out in the presence of a water-soluble sodium salt, potassium salt, magnesium salt, calcium salt, barium salt, zirconium salt, iron salt, nickel salt, aluminum salt, or silicate.

6. A process for the preparation of a black coloring agent in powder form, which comprises bringing a black coloring agent in gel form obtained by a process as set forth in claim 3 into contact with an aqueous solution o an alkali.

7. A process for the preparation of a black coloring agent in powder form, which comprises forming a film of a black coloring agent in gel form prepared by a process as set forth in claim 3 and pulverizing the formed film.

8. A process for the preparation of a black coloring agent in powder form, which comprises dyeing particles of a polymeric material with a black coloring agent in gel form prepared by a process as set forth in claim 3.

9. A process for the preparation of a black coloring agent in powder form according to claim 8, wherein the dyeing is carried out in the presence of a water-soluble sodium salt, potassium salt, magnesium salt, calcium salt, barium salt, zirconium salt, iron salt, nickel salt, aluminum salt, or silicate.

10. A process for dyeing a fiber, which comprises dyeing said fiber with a black coloring agent in gel form prepared by a process as set forth in claim 3.

11. A process for dyeing a fiber according to claim 10, wherein the dyeing is carried out in the presence of a water-soluble sodium salt, potassium salt, magnesium salt, calcium salt, barium salt, zirconium salt, iron salt, nickel salt, aluminum salt, or silicate.

12. A process for increasing the blackness of black iron oxide, which comprises coating a black coloring agent in gel form prepared by a process as set forth in claim 3 on the surface of said black iron oxide.

13. A process according to claim 12, wherein the coating is carried out in the presence of a water-soluble sodium salt, potassium salt, magnesium salt, calcium salt, barium salt, zirconium salt, iron salt, nickel salt, aluminum salt, or silicate.

14. A process for the preparation of a black coloring agent in powder form, which comprises dyeing particles of a polymeric material with a black coloring agent in liquid form prepared by a process as set forth in claim 4.

15. A process for the preparation of a black coloring agent in powder form according to claim 14, wherein the dyeing is carried out in the presence of a water-soluble sodium salt, potassium salt, magnesium salt, calcium salt, barium salt, zirconium salt, iron salt, nickel salt, aluminum salt, or silicate.

16. A process for dyeing a fiber, which comprises dyeing said fiber with a black coloring agent in liquid form prepared by a process as set forth in claim 4.

17. A process for dyeing a fiber according to claim 16, wherein the dyeing is carried out in the presence of a water-soluble sodium salt, potassium salt, magnesium salt, calcium salt, barium salt, zirconium salt, iron salt, nickel salt, aluminum salt, or silicate.

18. A process for increasing the blackness of black iron oxide, which comprises coating a black coloring agent in liquid form prepared by a process as set forth in claim 4 on the surface of said black iron oxide.

19. A process according to claim 18, wherein the coating is carried out in the presence of a water-soluble sodium salt, potassium salt, magnesium salt, calcium salt, barium salt, zirconium salt, iron salt, nickel salt, aluminum salt, or silicate.

* * * * *